Dec. 30, 1969  L. A. CROSS, JR  3,486,617
APPARATUS FOR THE SELECTION OF CODED ELEMENTS FILED AT RANDOM
Filed March 9, 1965  14 Sheets-Sheet 1

INVENTOR.
L. ALLAN CROSS JR.
BY *Albert Sperry*
ATTORNEY

INVENTOR.
L. ALLAN CROSS, JR
BY Albert Sperry
ATTORNEY

Dec. 30, 1969 L. A. CROSS, JR 3,486,617
APPARATUS FOR THE SELECTION OF CODED ELEMENTS FILED AT RANDOM
Filed March 9, 1965 14 Sheets-Sheet 3
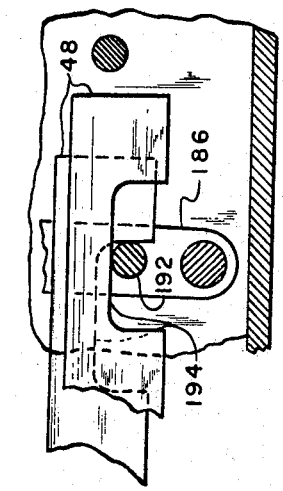
FIG. 12
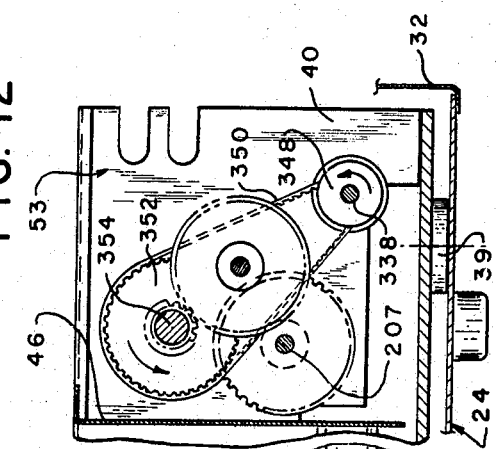
FIG. 4
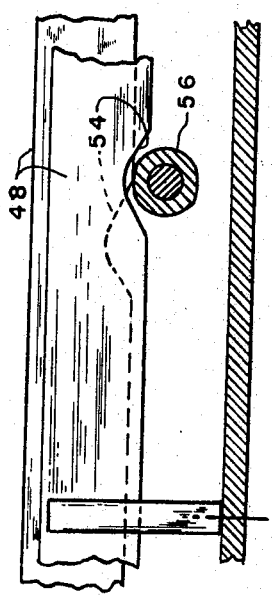
FIG. 11
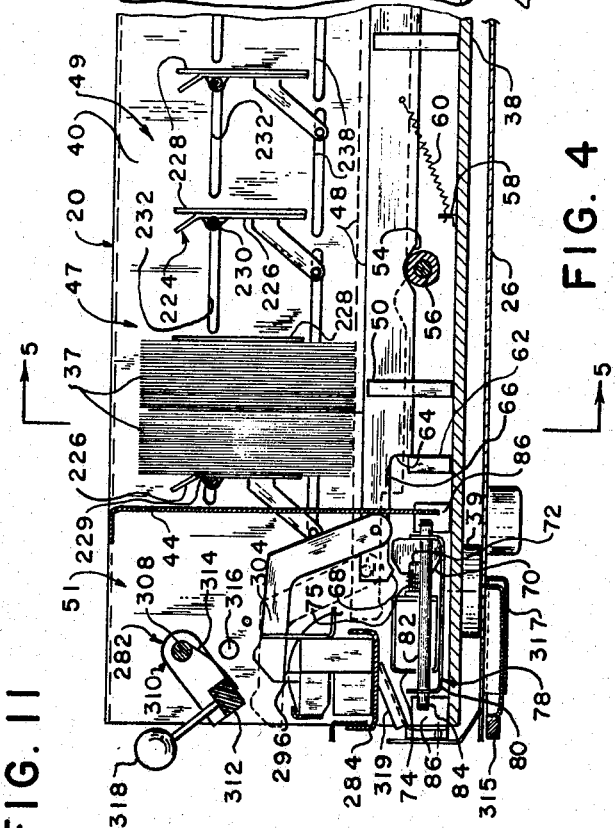
INVENTOR.
L. ALLEN CROSS, JR.
BY Albert Sperry
ATTORNEY Dec. 30, 1969  L. A. CROSS, JR  3,486,617
APPARATUS FOR THE SELECTION OF CODED ELEMENTS FILED AT RANDOM
Filed March 9, 1965  14 Sheets-Sheet 4

INVENTOR.
L. ALLAN CROSS JR.
BY Albert Sperry
ATTORNEY

INVENTOR.
L. ALLAN CROSS JR

Dec. 30, 1969   L. A. CROSS, JR   3,486,617
APPARATUS FOR THE SELECTION OF CODED ELEMENTS FILED AT RANDOM
Filed March 9, 1965   14 Sheets-Sheet 7

INVENTOR.
L. ALLAN CROSS JR.
BY *Albert Sperry*
ATTORNEY

Dec. 30, 1969   L. A. CROSS, JR   3,486,617
APPARATUS FOR THE SELECTION OF CODED ELEMENTS FILED AT RANDOM
Filed March 9, 1965   14 Sheets-Sheet 8

INVENTOR.
L. ALLAN CROSS, JR.
BY *Albert Sperry*
ATTORNEY

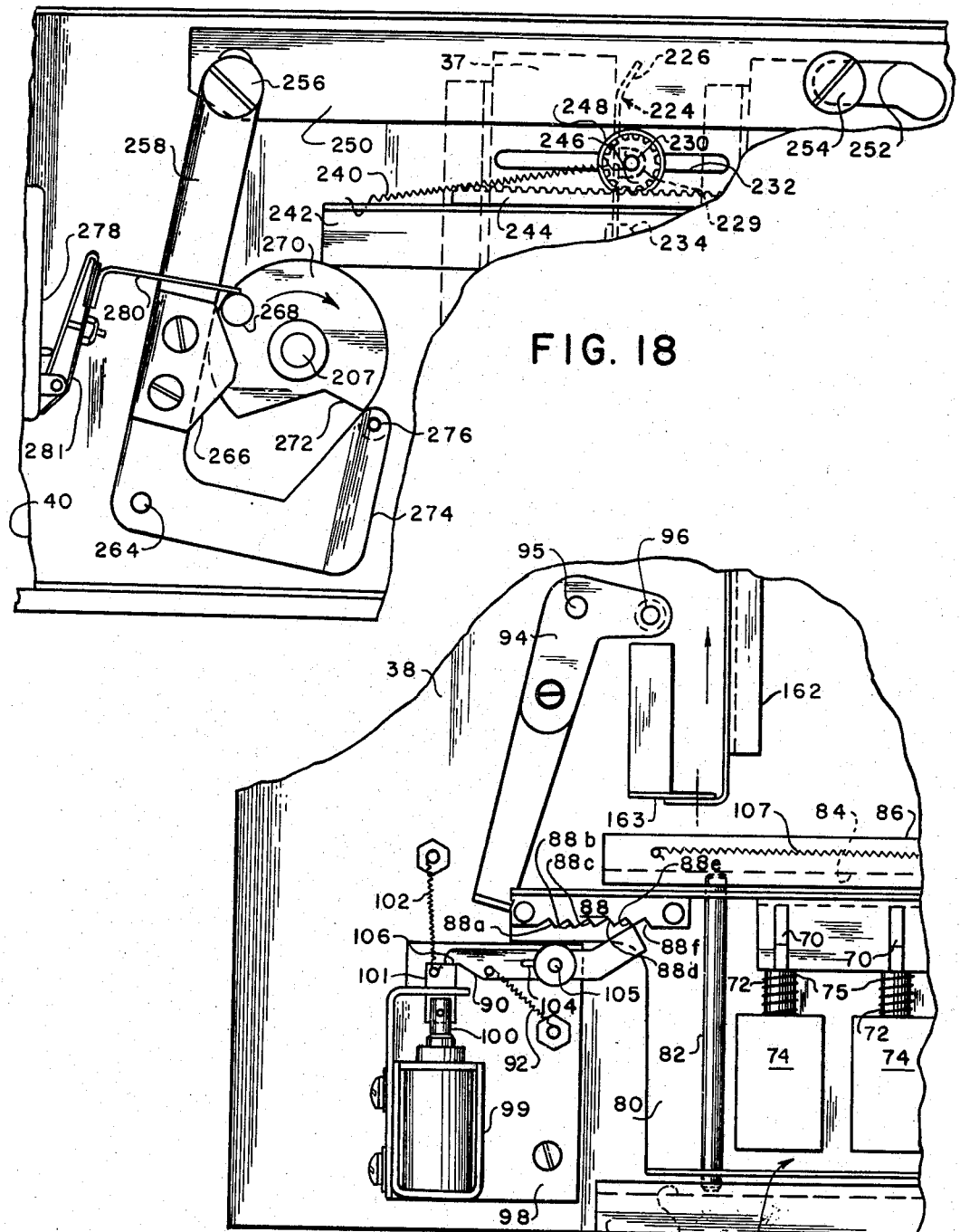

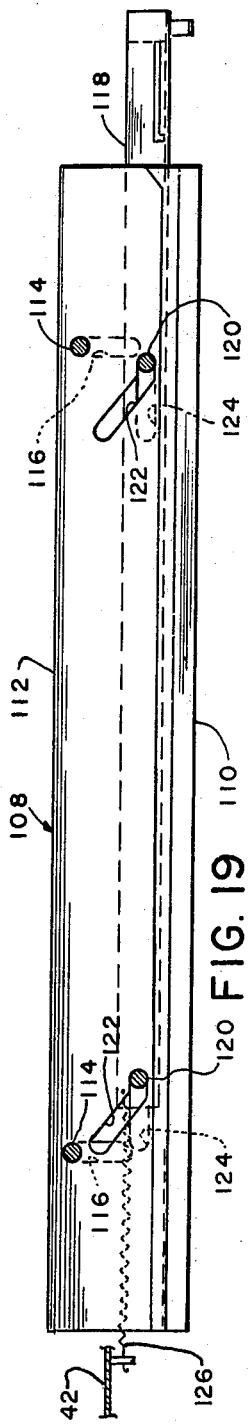

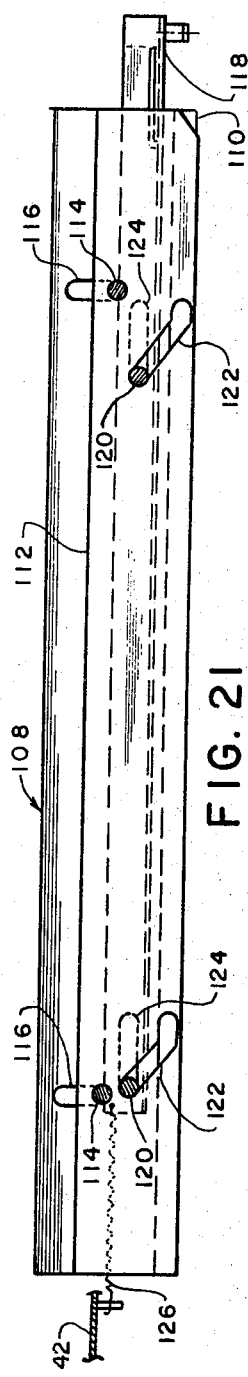
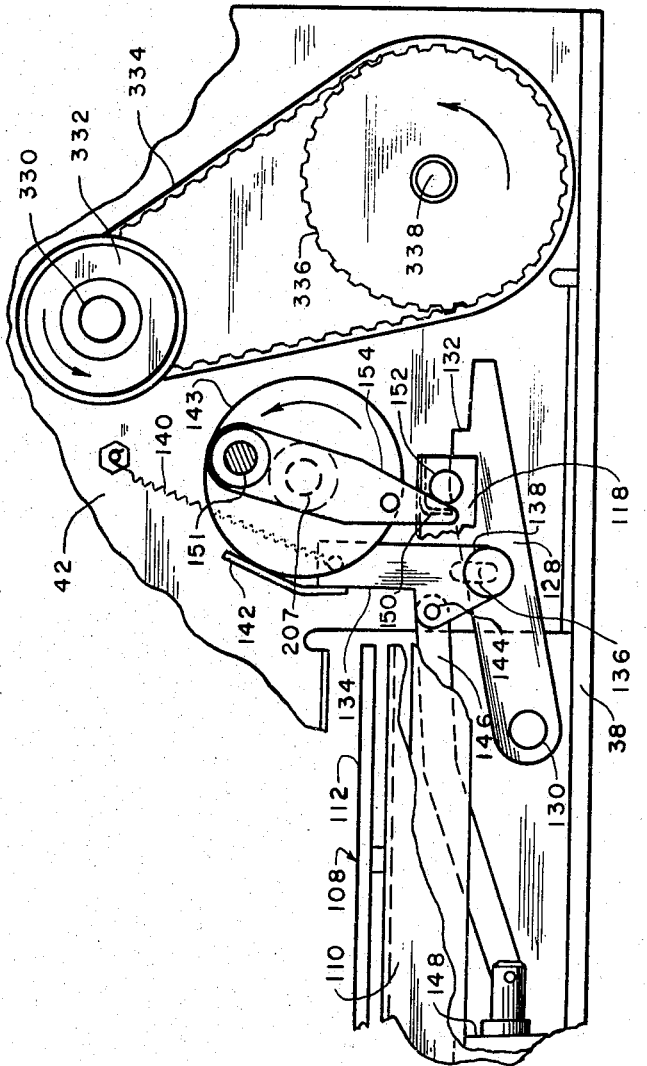
FIG. 21
FIG. 22
INVENTOR.
L. ALLAN CROSS, JR.
ATTORNEY

Dec. 30, 1969  L. A. CROSS, JR  3,486,617
APPARATUS FOR THE SELECTION OF CODED ELEMENTS FILED AT RANDOM
Filed March 9, 1965  14 Sheets-Sheet 12
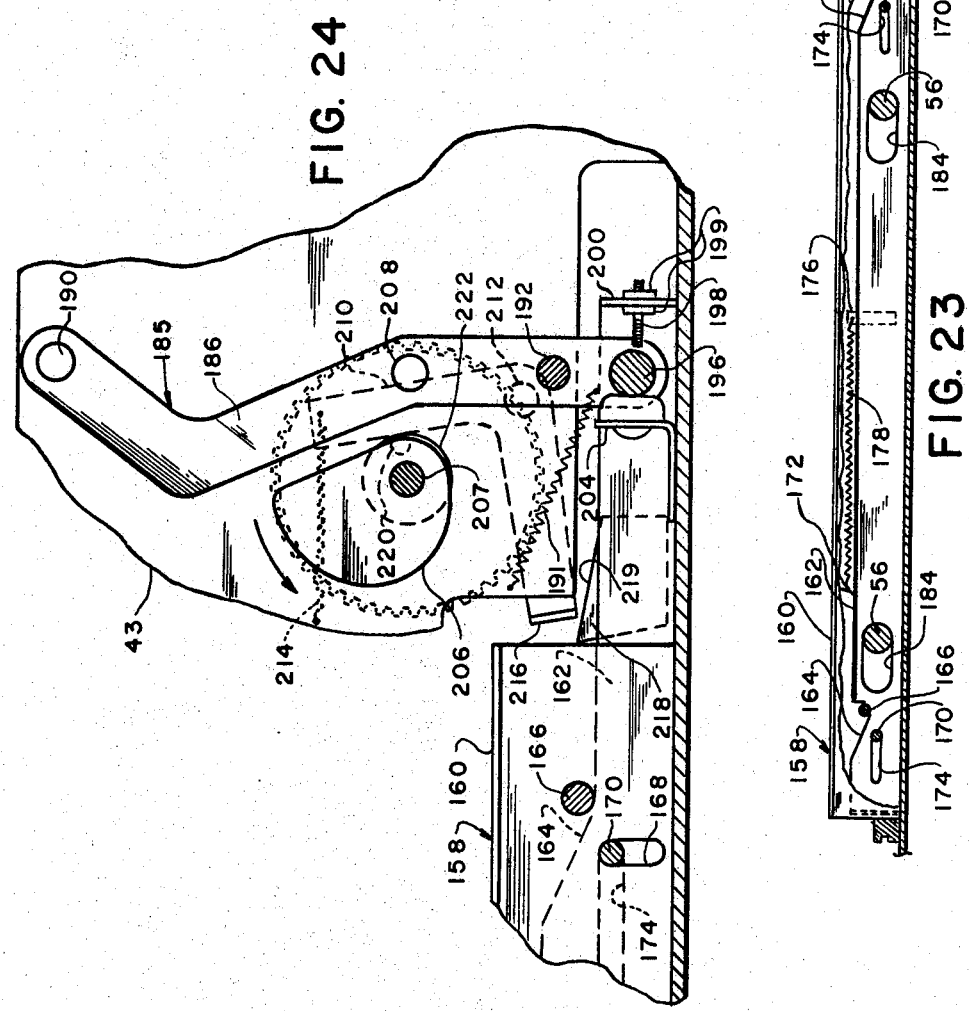
INVENTOR.
L. ALLAN CROSS, JR.
BY Albert Sperry
ATTORNEY United States Patent Office 3,486,617
Patented Dec. 30, 1969

3,486,617
APPARATUS FOR THE SELECTION OF CODED ELEMENTS FILED AT RANDOM
Laurence Allan Cross, Jr., Lambertville, N.J., assignor to Randomatic Data Systems, Inc., Trenton, N.J., a corporation of New Jersey
Filed Mar. 9, 1965, Ser. No. 438,216
Int. Cl. B07c *5/34*
U.S. Cl. 209—80.5
8 Claims

ABSTRACT OF THE DISCLOSURE

Randomly filed cards have code notches opening toward parallel selector slides. Cards are obtained by impressing the appropriate code upon a translator which elevates appropriate slides. Wanted cards are offset from unwanted cards by retraction of card support members, which subsequently shift the wanted cards to an access position.

To minimize adhesion, vibratory shafts are in direct contact and vibrate the elevated slides, serving also as cam surfaces upon which the slides are biased to their elevated positions. Movable dividers are operated between card-gripping and card-releasing positions in timed relation to the card selection and ejection cycle.

---

This application is a continuation-in-part of my co-pending applications Ser. Nos. 272,485, filed Apr. 11, 1963, now Patent No. 3,292,631; 280,964, filed May 16, 1963, now Patent No. 3,303,492; and 287,275 filed June 12, 1963, now Patent No. 3,231,186.

Storing and retrieving information is a field of endeavor that is presently experiencing tremendous growth. The many developments in the art, occurring in rapidly following succession, are testimony in themselves of the great imporance which the industrial and business world places upon data processing systems falling in this category.

Those systems of this type in which the information is coded and retained on a card or equivalent card-like element should meet certain basic requirements. Such a system should permit cards to be coded with maximum speed, ease, and simplicity. It should permit cards to be filed or otherwise stored with maximum speed and ease. And, it should produce wanted cards accurately, efficiently, and rapidly.

Many information storage and retrieval systems recently devised do meet the basic tests. However, in order to meet these cardinal requirements, the designers of the equipment have often built some accompanying disadvantages or deficiencies into their apparatus.

For example, in some systems, the cards themselves have metallic shields or armatures that become a drawback should it be desired to process the cards in other ways after removal from their storage positions. Other systems involve the necessity of coding the cards in such a way that they can be easily decoded and read by unauthorized individuals. It may be relatively unimportant, in some situations, whether or not the card can be so read. It is very definitely important in other instances, however, that the code on the card be such as to make it extremely difficult to be solved, and thus read, by unauthorized personnel or even those workers whose regular task it is to store and retrieve the cards.

In still other systems of which I have knowledge, the basic requirements described above have been met only at the expense of simplicity and compactness of the apparatus. This is obviously a disadvantage. No business or industry can profitably allow equipment to occupy an excessive amount of space, nor can the equipment be profitably used if it is complicated to the point where repairs and maintenance are disturbingly frequent.

Still further, in systems of the type described it is often impossible, except perhaps at great expense, to permit use of the apparatus in a multiple arrangement, operable from a single keyboard or console common to all of the various pieces of equipment. Equipment, in a good design, should be such as to permit a customer to use either one or many information storage and retrieval files, as desired.

A further problem in the art relates to the matter of coding the cards themselves. Reference is not here made to the code per se, which in general should not be such as to permit ready decoding by unauthorized individuals. Rather, the difficulty which has persisted has to do with the provision of well designed apparatus that can be used both for card punching, and also for card storage and retrieval. In many instances, the card punching mechanism has been a completely different machine, constructed at great expense and naturally carrying its own heavy repair and maintenance requirements.

This is the general background in respect to equipment of this type, and it is proposed in carrying out the invention to eliminate the problems which have heretofore existed.

My co-pending application Ser. No. 272,485, now Patent No. 3,292,631 covers an apparatus for the storage and retrieval of information. In carrying out its functions, the apparatus acts upon random-filed cards or equivalent data-carrying elements, coded for selection by keyboard operation. They are selected from the mass, and are quickly produced for use, by a single-cycle operation of the equipment.

As previously noted herein, the present application is a continuation-in-part of the application identified immediately above, and of my co-pending applications Ser. Nos. 280,964, now Patent No. 3,313,492, and 287,275, now Patent No. 3,231,186. It main, broad purpose is to imporve generally upon the inventions covered by its parent applications.

In a more particular sense, the objects of the present invention are the following:

First, to simplify the equipment to the maximum extent;

Second, to allow operation at high speed, for fast retrieval of information;

Third, to sharply reduce errors, jamming, and other malfunctions;

Fourth, to provide a novel divider structure, that will adjust automatically to widely differing card thicknesses and quantities, as well as to different operating conditions occurring in a single cycle;

Fifth, to improve the mechanism that physically selects cards, separates them from unwanted cards, and moves them to positions in which they are readily accessible for use;

Sixth, to design for array of a number of the machines in a group if this should be desired, with all the machines in the group to be operated from a single keyboard;

Seventh, to allow use of the apparatus either with or without a card-punching means, thus to, in effect, temporarily convert the apparatus into a card-punching device from its normal card selection and ejection functions; and Eighth, to provide an apparatus which, though characterized by a high degree of versatility and efficiency, will be of compact size and form and will cost much less than equivalent equipment that does not do more.

Summarized briefly, the invention includes a file tray having an opening providing access to a quantity of random-filed cards. Dividers separate the cards into readily handled decks to assure minimal surface adhesion and thereby facilitate wanted card selection and ejection.

The cards are notched, in a coded configuration covered in my copending application Ser. No. 285,336 filed June 4, 1963, now Patent No. 3,389,242.

Underlying the several decks is a series of parallel selector slides. By operation of a keyboard to impress upon the equipment a selected code corresponding to that of the desired cards, certain selector slides will be elevated in a matching configuration.

Cards coded in correspondence with the elevated slides are next freed for gravitation to lowered positions, then tilted while the unwanted cards are lifted slightly to clear the ejecting mechanism of the apparatus, and finally shifted laterally for easy manual or mechanical removal.

During the card selection and ejection process, a novel vibrating assembly acts on the cards to minimize surface adhesion and thus free the selected cards for gravitation. The vibrating means is at the same time a cam on which the slides representing the wanted code are biased to an operating position.

Dividers have been previously mentioned. These retain the several decks and adjust automatically to the deck thicknesses. When the machine is off, they grip the decks firmly. When the machine is on standby, they move to open positions in which each deck now occupies a space which is greater by a predetermined amount than the deck thickness, thus minimizing surface adhesion between cards when the apparatus is being cycled to produce wanted cards. When a cycle reaches its conclusion, the dividers move to sensing positions in which they detect the extent to which the deck has been thinned by removal of wanted cards. They then return to an open spacing which is adjusted to exceed the new deck thickness by the same predetermined amount mentioned previously herein.

A card-notching mechanism, comprising an improved version of one shown in my co-pending application Serial No. 287,275, now Patent No. 3,231,186 is mountably directly within the apparatus. In no way does it interfere with the card-selecting and ejecting functions. Yet, it is ready at all times for use in punching new cards that are to be added to the files. The card punching mechanism can be either assembled in or left out of the apparatus completely, according to the needs of the particular user.

Other objects will appear from the following description, the claims appended thereto, and from the annexed drawing, in which like reference characters designate like parts throughout the several views, and wherein:

FIG. 4 is an enlarged longitudinal sectional view, portions being broken away, substantially on line 4—4 of FIG. 3, the selector slides being shown in full lines in a normal, lowered position and in dash lines in a raised use position;

FIG. 11 is an enlarged detail view showing one of the selector slides fragmentarily in side elevation, an associated combination vibrating and cam bar being shown in cross-section, the full line showing the slide in its normal, latched position and the dash lines showing the same in its released, raised position;

FIG. 12 is an enlarged detail view showing the rear end portion of one of the selector slides in side elevation, in association with a slide return yoke illustrated in transverse section, the full lines showing the slide in its normal, latched position and the dash lines showing the same in its released, raised position;

FIG. 16 is a view like FIG. 15 with the parts in a stepping position;

FIG. 18 is a view like FIG. 17 in which the divider assembly is locked;

FIG. 19 is an enlarged horizontal section substantially on line 19—19 of FIG. 5 showing the sweeper bar mechanism in its home position;

FIG. 20 is an enlarged fragmentary view substantially on line 20—20 of FIG. 3 showing the sweeper bar operating mechanism in its rest position, and error correction means;

FIG. 21 is a view like FIG. 19 with the sweeper bar retracted from its normal, card-underlying, home position;

FIG. 22 is a view like FIG. 20 with the sweeper bar operating mechanism unlatched to retract the sweeper bar;

FIG. 23 is an enlarged fragmentary vertical longitudinal section substantially on line 23—23 of FIG. 3, showing the vertical lift bar in its fully lowered position, together with its operating mechanism;

FIG. 24 is a still further enlarged detail sectional view on the same cutting plane as FIG. 23 showing the lift bar operating mechanism;

In carrying out my invention, I have found it expedient to assemble a plurality of mechanisms, readily identifiable one from another, into a unitary apparatus that produces the desired results. These mechanisms or assemblies are listed below. To facilitates understanding of the invention, I have broken down, in a corresponding manner, the detailed description of the invention, and have added a section explaining the complete operational sequence.

Thus, the description proceeds under the following headings:

(1) Support structure;
(2) Selector slide assembly and operating mechanism therefor;
(3) Sweeper bar assembly;
(4) Vertical lift mechanism;
(5) Divider assembly;
(6) Card punch mechanism;
(7) Drive mechanism;
(8) Operation: card selection and ejection; and
(9) Electrical circuits

SUPPORT STRUCTURE

In carrying out my invention, I utilize an elongated, approximately rectangular, comparatively shallow file tray generally designated 20, in association with a keyboard generally designated 22. So far as its internal construction is concerned, the keyboard essentially comprises merely an assembly of switches, controlling circuits to various sections of the apparatus. Hence, it will not be further discussed herein except to identify its keys or buttons in relation to the particular components of tray 20 which they control.

Figure 2:
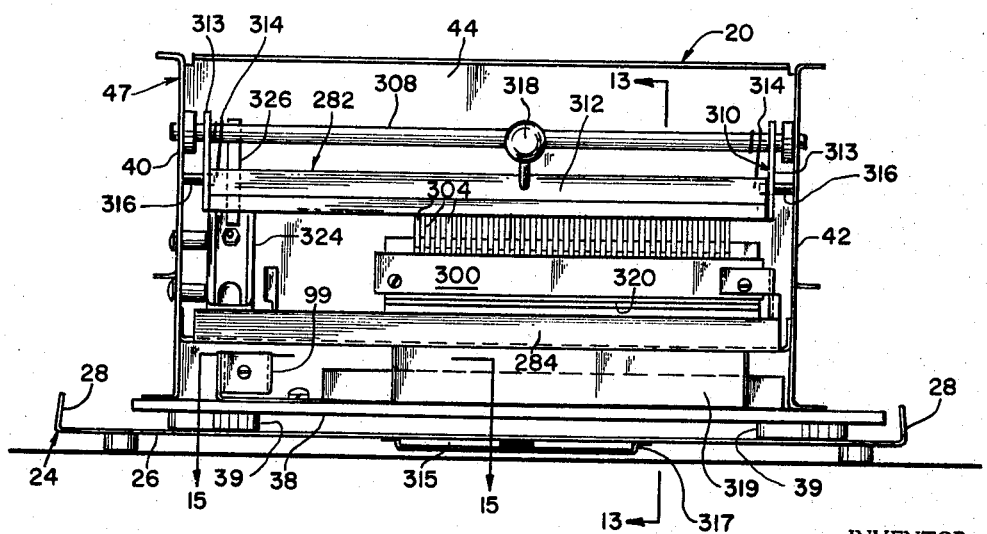
FIG. 2 is an enlarged front end elevational view of the apparatus with the cover removed, as seen from the right of FIG. 1.

Tray 20 includes a housing generally designated 24, having (FIGS. 2 and 4) a flat, rectangular sheet metal base 26 formed along opposite sides thereof with upwardly turned longitudinal flanges 28. A front end plate 30, rear end plate 32, and an open-ended cover 34 having depending side walls 35, are removably, fixedly secured to the base to complete the housing.

In the cover, there is a large, rectangular access opening 36 through which cards 37 or equivalent information-bearing elements can be inserted or removed.

Mounted upon the base 26, in a horizontal position elevated slightly above the base, is a flat, rectangular support plate 38. This is approximately coextensive in length with, but is slightly narrower than, the base. Plate 38 is spaced from the base by means of rectangularly-spaced blocks 39. Projecting vertically upwardly from and rigidly secured to the respective side edge portions of the support plate 38 are longitudinally flanged side plates 40, 42. These are substantially coextensive in length with the support plate. Intermediate the side plates there is provided a divider or longitudinal partition 43 separating the rear end portion of the housing into a motor compartment and a gear compartment disposed in side-by-side relation.

Fixedly secure to and extending between the side plates well inwardly from the front and rear ends of the base plate (see FIG. 3) are transversely disposed front and rear frame panels 44, 46 respectively. Thus, the support plate 38, side plates 40, 42, and front and rear panels 44, 46 all cooperate in defining a support frame 47 fixedly mounted in the housing 24 on base 26.

SELECTOR SLIDE ASSEMBLY AND OPERATING MECHANISM THEREFOR

Figure 6:
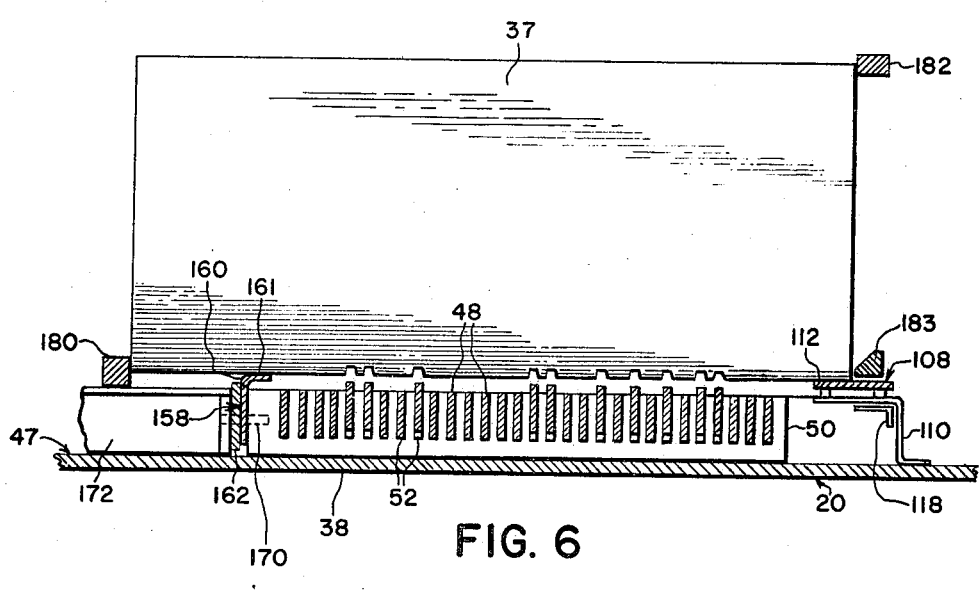
FIGS. 6–10 are views like FIG. 5 showing successively following stages of a single operating cycle.

In accordance with the invention, I provide a series of closely-spaced, parallel, flat, elongated selector members 48. These are in the form of slides that extend horizontally, in vertical planes, through the full length of a center compartment 49 of the housing defined between panels 44, 46, and project partially into front and rear compartments 51, 53 respectively. The selector slides are elevated slightly above the base 38 by four selector slide guides 50. The number is not critical. Guides 50 are affixed to support plate 38 and are spaced longitudinally of the selector slides 48, extending transversely of the support frame 47 normally to the length of the slides. Each guide 50 has uniformly spaced, upwardly opening, deep, narrow guide slots 52, receiving the several slides 48. The slides 48 slide in the direction of their lengths within the guide slots. They can also, as shown in FIG. 6, move upwardly and downwardly within the lot.

Referring to FIGS. 4 ant 11, the several slides 48 are formed with downwardly opening cam recesses 54, of shallowly V-shaped form. There are two cam recesses formed in and spaced longitudinally of each slide. Since the several slides are identical, the corresponding cam recesses 54 thereof align transversely of the series of slides, so that there is a front transverse row and a rear transverse row of recesses in the slide series.

Journalled in the slide plates 40, 42 of the support frame are front and rear rotary shafts 56 extending transversely of and below the series of slides 48. In the normal, full line position of the slides 48 shown in FIG. 4 (this being the slide position between operating cycles) the front and rear shafts 56 are respectively seated in the front and rear series of cam recesses 54. When, however, selected slides are to be raised to the dash line position shown in FIG. 4 (as later described herein) the slides so selected are moved forwardly. This causes them to be biased upwardly, as the inclined rear edges of the recesses 54 ride up on the shafts 56. In the final position of slides that have been so moved, the shafts 56 underlie the moved slides immediately rearwardly of the recesses 54 thereof.

The shafts 56, thus, constitute cam bars that bias the slides upwardly from their normal, rest positions.

The shafts 56, however, are also vibrating devices. For this purpose, they are rotated by means of a driving connection extending from a motor 57 mounted on the support frame in rear end compartment 53. The driving connection will be described in detail hereinafter. It is sufficient to note at the present time that each shaft 56 is not perfectly round. Rather, its cross-section is best described as basically square with heavily rounded corners.

As a result, when shafts 56 rotate they vibrate the selected or elevated slides 48. This vibratory motion is in turn transmitted to the cards 37 supported in contact with and extending transversely of the series of slides.

Surface adhesion of juxtaposed cards is thus rendered minimal. Therefore, a selected card, in a manner to be made apparent hereinafter, is freed for gravitation to a lowered position in respect to the remaining, unwanted cards.

Again referring to FIGURE 4, each slide is independently spring-loaded for forward movement whenever it is freed for such movement. A cross bar 58 extends transversely of the support frame, being secured fixedly to the support plate 38 approximately medially between the ends of the slides. A plurality of expansion springs 60 are individually associated with the slides 48, and are connected between bar 58 and their associated slides. The springs are under tension effective to bias the slides in a forward direction. However, the slides are normally restrained against forward movement between operating cycles by a transversely extending, upstanding latch bar 62 (FIG. 4). This extends below the forward end portions of the slides, across the entire series of slides.

The slides are provided, at their front ends, with downwardly opening end recesses 66 of approximately right angular configuration. These define vertical shoulders 64 normally engaged by the latch bar 62 to restrain the slides against forward movement under the bias of springs 60. The recesses are continued to the forward extremities of the slides 48. At their front ends, there are shallowly V-shaped, downwardly projecting cam projections 68. The cam projections 68 are aligned in a row extending transversely of the slide series, when the slides are in their normal full line positions of FIG. 4.

In front end compartment 51 (see FIGS. 3 and 4), I provide a transverse row of five uniformly spaced cam plates 70. These are flat, lie in vertical planes, and are movable into coplanar relation with selected slides 48. When so moved, the cam plates lie adjacent the projections 68 of the slides with which the plates have become coincident. If, now, the plates are moved to the left in FIG. 4, they will cam the slides with which they are coplanar upwardly by camming engagement with the projections 68 of said slides. Though this upward slide movement is only slight, it is enough to cause the affected slide to clear latch bar 62. The springs 60 secured to the unlatched slides are thus free to contract and will bias the unlatched slides forwardly. As the slides move forwardly they ride up on bars 56 as previously described herein, to the dash line position of FIG. 4.

Each cam plate 70 is secured to the core 72 of an associated solenoid 74. Normally, the cores are extended under the bias of return springs 75, when the solenoids are in their normally deenergized condition. The energization of the solenoids is controlled by operation of code buttons or keys 76 of keybord 22.

There are ten keys, one for each of the digits "0" through "9." Depression of a selected key 76 impresses on the apparatus the digit corresponding to that key. Depression of selected keys in a following order impresses a complete, desired, coded number on the apparatus. The number can have six digits or characters in the illustrated equipment, so that it can be as high at 999,999.

It will be understood that six-digit numerical coding has been illustrated and described herein only by way of example. The apparatus, as will be recognized from the following description, can use other than numerical coding (for example, alphabetical). Further, the number of characters can be more or less than the six characters described herein, depending upon the code structure used.

The cards are coded correspondingly. If for instance the number 714,938 is impressed on the apparatus, all cards coded to this number will be produced. How this happens will now be described.

All the solenoids 74 are carried by a slidably mounted carriage generally designated 78, having a bed plate 80 to which the solenoids 74 are affixed. Bed plate 80 is carried by cross bars 82, sliding in slideways 84 of support rails 86 mounted upon the base plate 38.

Figure 3:
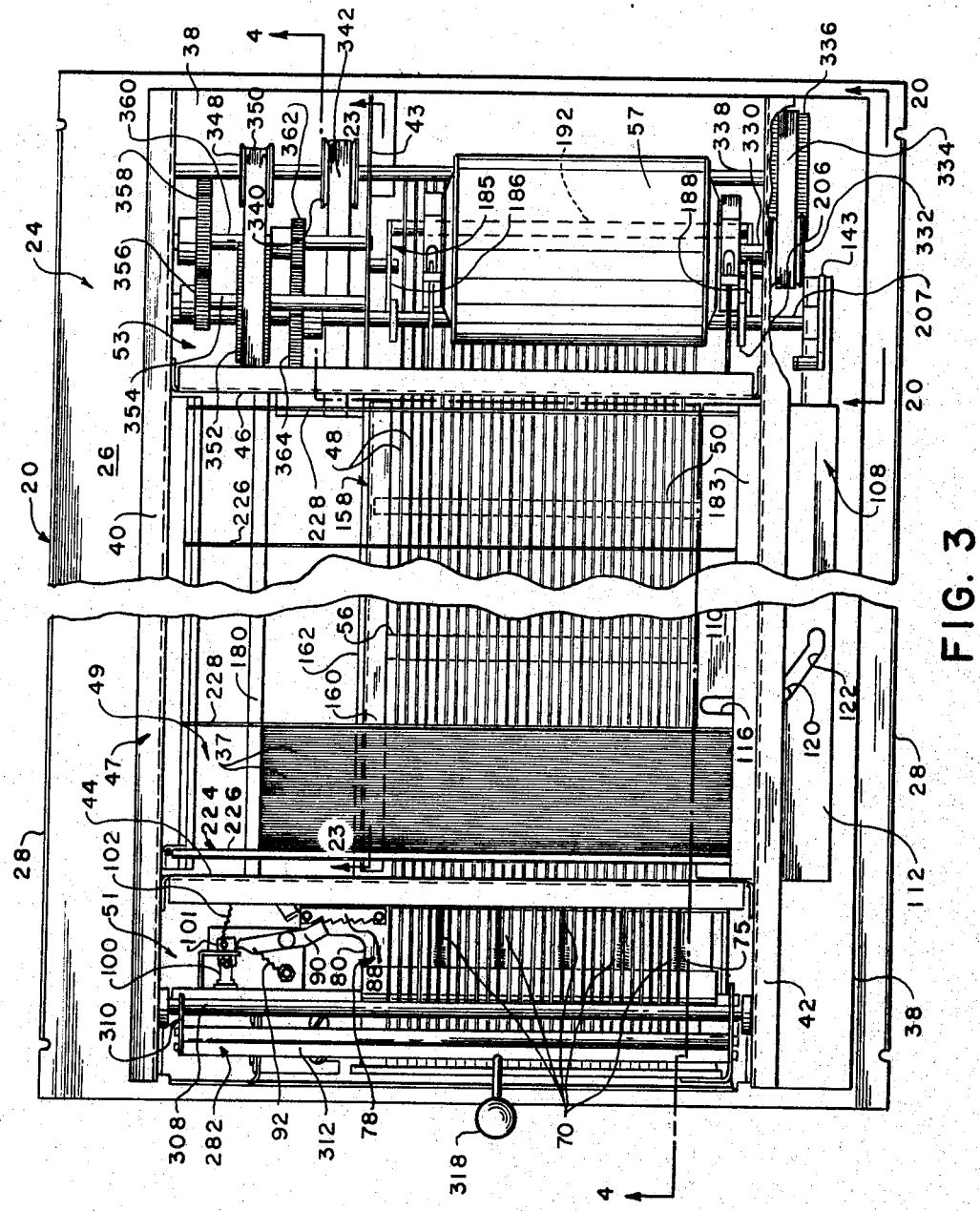
FIG. 3 is an enlarged top plan view of the equipment with the cover removed, portions being broken away.

Referring to FIG. 3, at one end of the carriage 78 the bed plate 80 has an extension on which is mounted a ratchet 88, engaged by a pawl 90. The ratchet has six notches in the present instance. Each notch is associated with corresponding selector slides 48 occurring in each of five groups of slides. Thus, referring to FIG. 5, one sees that there are thirty slides, comprising five groups of six slides each. Each group is acted upon by a particular one of the five solenoids 74. The groups have been designated 1, 2, 3, 4 and 5 respectively.

Figure 5:
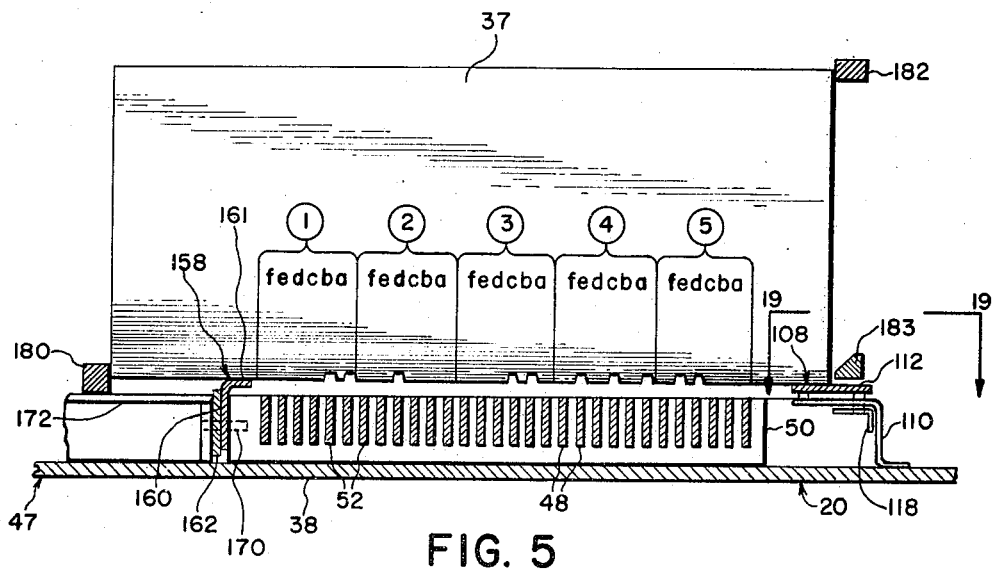
FIG. 5 is a transverse sectional view, still further enlarged, taken substantially on line 5—5 of FIG. 4, with the cards and associated portions of the mechanism being shown in their normal, rest positions between operating cycles of the equipment, portions of the equipment being broken away.

Referring to FIG. 5, corresponding slides in the several groups have been given the same designation within their groups. Thus, in each group there are slides *a, b, c, d, e* and *f*. All slides that are identified by the letter *a* are corresponding slides, and have the same location within their groups. The same is true for all the slides designated *b*, all the slides *c*, etc. In a six-digit, coded number, the first slide location (occupied by all the slides *a*) represents the first digit, the second slide location (occupied by all the slides *b*) represents the second digit, and so on through slide location 6 which represents the sixth and final digit. I utilize a modified binary code; so, to select a particular digit—any digit from 0 through 9—I pair selected corresponding slides that are disposed in two predetermined groups, according to a code explained in detail in my co-pending application Ser. No. 285,336.

Thus, if the coded number 714,938, by way of example, is to be impressed upon the equipment, to produce all random-filed cards bearing this code, the procedure is to first locate all the cam plates 70 in coplanar relation with the slides *a* of groups 1 through 5. Stated otherwise, the first step is to locate the five solenoids 76 in line with the five slides *a*. Since the first digit of the wanted, complete number is "7," two of the solenoids, so located, are energized in a predetermined combination. These cause elevation of those slides *a* which, when paired, represent the numeral "7." For example, let it be assumed that these are the slides *a* of slide groups 3 and 4.

Normally, between cycles, the solenoids are all in line with the slides *a* of the several groups, so they will be ready for energization when the first digit is called for as described above.

The next step is to bodily shift all the solenoids, conjointly, to the next slide location. This movement is from right to left, viewing the apparatus as in FIGS. 5–10 and 15. The cam plates 70 and solenoids 74 will now be in line with all the slides *b* of the several groups. The digit now to be impressed upon the apparatus is "1." According to the code as described in my copending application, this involves energizing solenoids associated with groups 1 and 5. Step by step, the bank of solenoids is advanced from one slide location to the next following slide location until it has acted upon slides at all six locations, in predetermined pairings of corresponding slides, to impress the complete number 714,938 upon the apparatus.

To move all the solenoids from location to location in this way, the carriage 78 is bodily shifted, step by step, through the cooperating action of the ratchet 88 and pawl 90. Pawl 90, normally (between cycles), is engaged in the notch of the ratchet 88, that is furthest from the several selector slides 48. This notch, designated 88*a* (see FIG. 15), corresponds to slide location *a* of groups 1 through 5. An expansion spring 92 connected between the pawl and the base plate 38 normally biases the pawl into engagement with the ratchet. When the carriage is advanced one step to the next slide location, the pawl, against the restraint of spring 92, moves out of notch 88*a* and enters the next notch 88*b*. The carriage is now so located as to position the several cam plates 70 in the next slide location, under all the slides *b* of the several groups 1, 2, 3, 4 and 5. Two of the solenoids 74 are now energized by depression of a selected key 76 to impress the second coded digit (the digit "1" in the given example "714,938") on the apparatus.

Figures 15, 17:
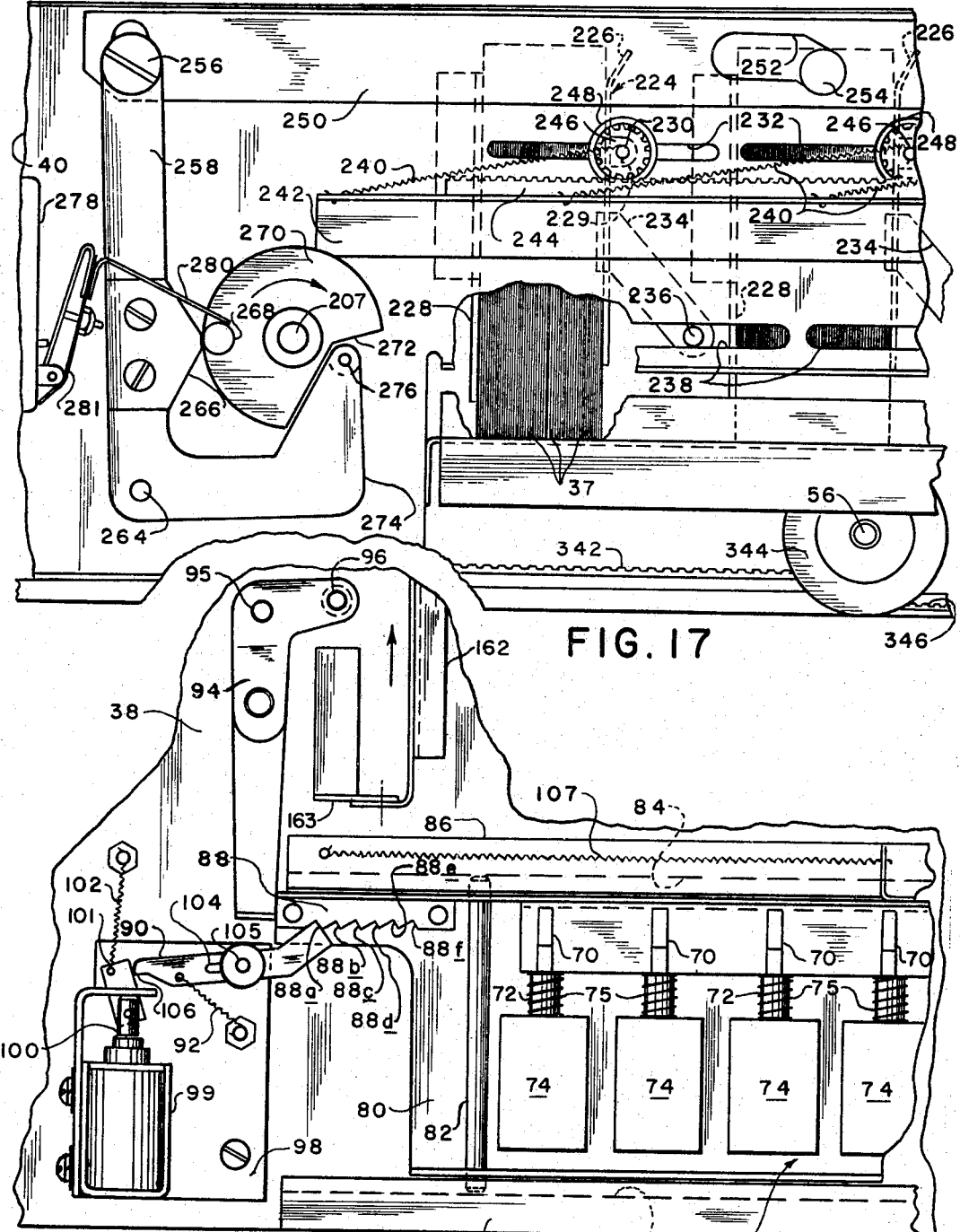
FIG. 15 is an enlarged fragmentary, horizontal sectional view on line 15—15 of FIG. 2, showing the translator and its associated stepping means in rest position.
FIG. 17 is an enlarged fragmentary side elevational view of the rear end portion of the apparatus with the cover removed, taken substantially on line 17—17 of FIG. 1 and showing the divider assembly in unlocked position.

The impression of each digit on the apparatus causes automatic one-step advancement of the carriage to the left as viewed in FIGS. 3 and 15. When it leaves notch 88*b*, pawl 90 is successively engaged in notches 88*c*, 88*d*, 88*e*, and 88*f*, corresponding to slide locations *c, d, e,* and *f* respectively. In each of these positions, another digit is impressed on the apparatus (in the given example, these would be the digits "4," "9," "3," and "8" respectively).

After pawl 90 has entered notch 88*f* and all components shown in FIG. 15 are ready for return to their normal home positions shown in that figure of the drawings, a bell crank lever (FIGURES 15 and 16) is utilized for returning the translator or carriage 78 to said home position thereof.

The bell crank 94 is pivoted for horizontal swinging movement about a pin 95 mounted on the base plate 38. The bell crank has a long arm that bears against the adjacent end of the translator 78, so that when the translator moves to the left in FIG. 15 from its rest position, it will rotate the bell crank in a clockwise direction as viewed in this figure of the drawing.

Eventually, after the translator has moved to its last position with pawl 90 in notch 88*f*, the bell crank is swung in a reverse direction to return the translator to its rest position. This is accomplished by movement of a bar 162 in the direction of the arrow seen in FIG. 15. The bar is so moved at a later stage in the cycle, and as shown, has a reversely extended finger 163 engaging a lug 96 depending from the short arm of the bell crank to swing the bell-crank counterclockwise in FIG. 15.

The step-by-step advancement of the carriage 78, from its FIGURE 15 home position to its final position with pawl 90 in the last notch 88*f*, is effected by a stepping solenoid 99 mounted on a bracket 98 affixed to support plate 38. Solenoid 99 has a core 100 to which is pivotally connected a laterally swingable, rectangular, pusher plate 101. The outer end of the pusher plate is connected, at the corner of the plate remote from pawl 90, to one end of an expansion spring 102, the other end of which is anchored to support plate 38. Spring 102, tending to contract, extends the core 100 in the deenergized, normal condition of solenoid 99.

Pawl 90 is provided with a longitudinal slot 104, receiving pin 105 that extends upwardly from bracket plate 98. Pin 105 provides the pivot about which the pawl 90 swings, between its FIGURE 15 home position and its notch-disengaging position shown in FIGURE 6.

The end of the pawl remote from the ratchet is reduced to provide a nose 106, and between nose 106 and pivot pin 105, spring 92 is connected, and is tensioned between support plate 38 and pawl 90. Spring 92 thus tends to rotate pawl 90 to a position in engagement with one of the notches of the ratchet 88.

An elongated expansion spring 107 is connected between carriage 78 and the support structure, in a position such as to normally shift the carriage to the left in FIGURE 15. The above-described return movement of the carriage under the resetting action of bell crank 94 is against the force of the spring 107, which is thus placed under its maximum tension when pawl 90 is in the notch 88a.

Each time the carriage is to be advanced one step, solenoid 99 is energized. Energizing of the solenoid 99 occurs simultaneously with energizing of two, selected solenoids 74 for the purpose of elevating the selector slides 48 needed to impress a particular digit on the apparatus during the card selection process described previously herein. This occurs responsive to depression of the appropriate, selected key 76. Depression of a particular key 76 will energize the particular pair of solenoids 74 associated with that key. Regardless of which key 76 is depressed, however, stepping solenoid 99 will be energized simultaneously with the desired pair of solenoids 74.

Accordingly, when the selected solenoids 74 are energized in, for example, slide position a shown in FIGURE 5, two of the selector slides will be elevated as previously described herein. At the same time, solenoid 99 will be energized and its core 100 will thus be retracted against the restraint of the spring 102.

The result will be that plate 101 will swing clockwise, viewing the same as in FIGURE 15, to engage behind nose 106 of pawl 90.

When, now, the electrical signal produced by depressing key 76 is terminated, the solenoids 74 that were energized responsive to depression of that key will be deenergized. Solenoid 99 will also be deenergized, and spring 102 will accordingly be free to contract. This causes pawl 90 to swing clockwise, viewing the same as in FIGURE 15, to its FIGURE 16 position.

The instant that the pawl 90 is disengaged from notch 88a spring 92 will tend to shift the pawl in the direction of its length, to the right in FIGURES 15 and 16, so as to move the nose 106 off the pusher plate 101. At the same time, spring 107 is free to contract, and shifts carriage 78 to the left in FIGURES 15 and 16. Spring 92 is simultaneously exerting pull upon the pawl tending to rotate the same counter-clockwise in FIGURE 16. The pawl thus engages in the next notch 88b.

In practice, this action occurs so rapidly as to be incapable of being followed by the human eye. Pawl 90, though disengaging from each notch in turn, never moves completely out of contact with the ratchet 99. Rather, due to the pull of the spring 92, the pawl follows the contour of the serrated edge of the ratchet. Therefore, the carriage 78, under the pull of spring 107, never skips a step, in its movement to the left, in FIGURE 16, that is, pawl 90 engages in every notch from 88a through 88f, in succession.

When the pawl moves into the next following notch, the parts are returned to their position as shown in FIGURE 15, ready for depression of another one of the keys 76 to repeat the above-described operation in the next following slide location b, c, d, e, or f as the case may be.

SWEEPER BAR ASSEMBLY

Figure 7:
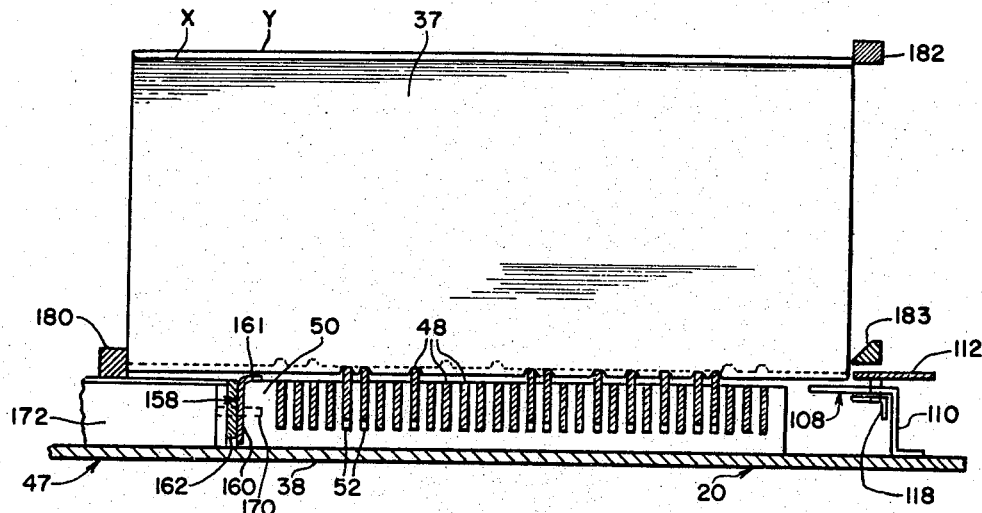
Figure 8:
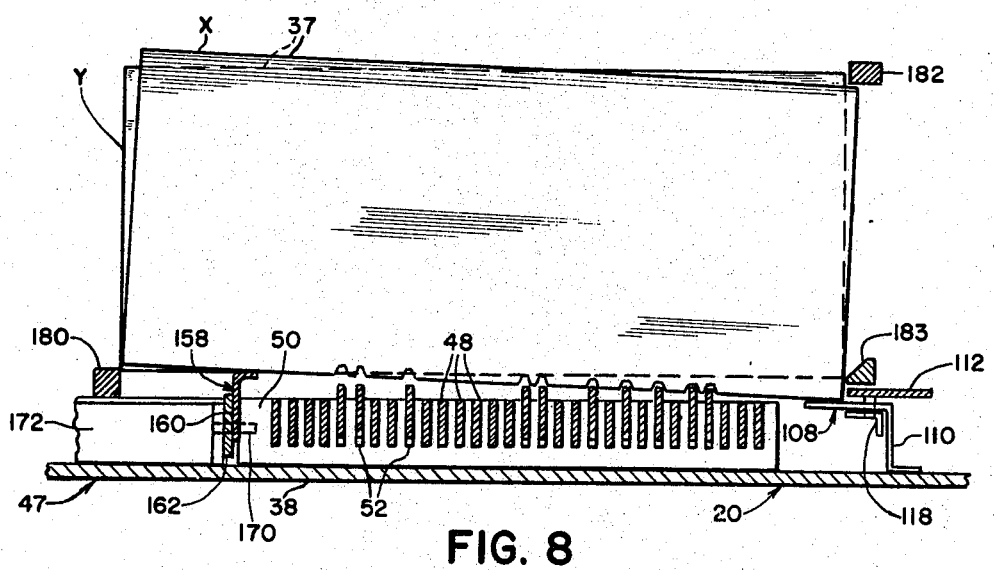
Figure 9:
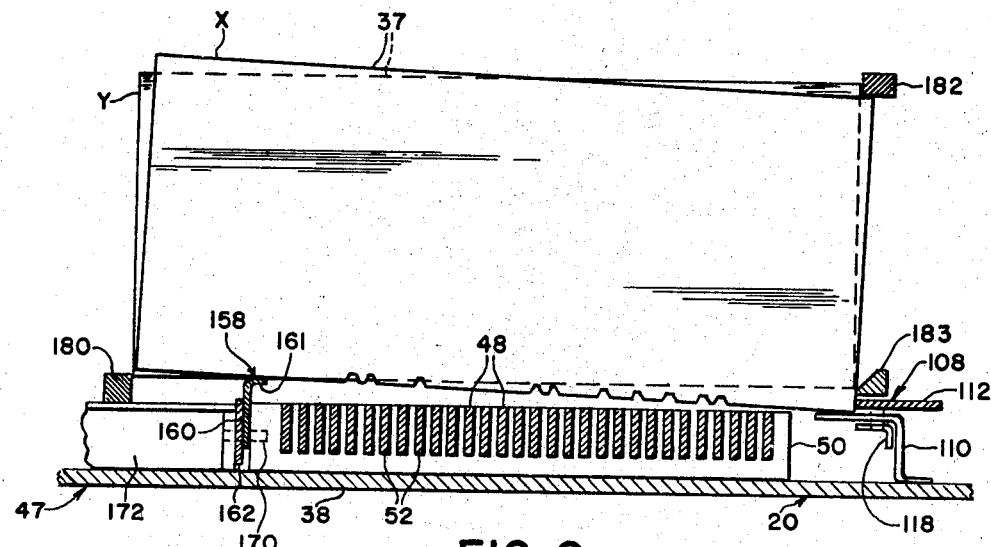

Referring to FIGURES 3, 5–10, and 19, the supporting of cards 37 and their ejection, following selection of the cards in the manner described above, is accomplished as follows:

A sweeper bar assembly generally designated 108 includes an elongated sweeper bar support rail 110 fixedly mounted upon support plate 38. A flat, correspondingly elongated sweeper bar 112 is supported upon rail 110 for transverse movement. Bar 112 is shiftable between its normal position shown in FIGURES 5, 6, and 10, in which position it supports cards 37 at their righthand ends, viewing the same as in FIGURE 5, and a moved position clear of the cards (FIGURES 7–9). To guide and limit the movement of the sweeper bar, I provide (FIGURE 19) pins 114 secured to the sweeper bar, extending downwardly through transverse slots 116 formed in the sweeper bar support rail 110.

Movement of sweeper bar 112 between its normal position shown in FIGURE 5 and its moved position shown in FIGURE 7 is effected by an elongated sweeper bar operator 118 (FIGURE 19) of right-angular cross section. The sweeper bar operator 118 underlies rail 110 (FIGURE 5). Projecting upwardly from the operator 118 at locations spaced longitudinally thereof are lugs 120 extending through cam slots 122 of bar 112, and through guide slots 124 formed in rail 110. In FIGURE 19, bar 112 and operator 118 are in normal position. To move the sweeper bar 112 to its FIGURE 7 position, the operator 118 is shifted to the left, viewing the same as in FIGURE 19. The extent of this movement is controlled by the length of the slots 124. As the operator 118 moves to the left, the lugs 120 bear against one edge of the cam slots 122, so as to bias the sweeper bar 112 to the right in FIGURE 5.

The extent of this movement of bar 112 is controlled by a length of the slots 116 of the rail 110. The slots 116, further, insure that the sweeper bar movement will be in a path directly normal to its length.

The movement of the sweeper bar operator 118 to the left in FIGURE 19, for the purpose of shifting the sweeper bar 112 to its FIGURE 7 position, is caused by contraction of an expansion coil spring 126 connected between the operator 118 and the side plate 42. Normally, the operator 118 is latched in its FIGURE 19 position, with the spring 126 under tension.

In FIGURE 20, the sweeper operator 118 is shown in its normally latched position, so that the sweeper bar 112 would be in its FIGURE 5 home position. The operator 118 is held in this position, against the force of the spring 126, by a vertically swingable latch arm 128 pivoted as at 130, at one end, on the support rail 110. At its other, free end, the latch arm 128 is cut away to define a shoulder 132.

A shift link 134, extending substantially vertically adjacent latch arm 128 has, at its lower end, a sliding pivotal connection to the intermediate portion of the latch arm. To provide such connection, link 134 has a short, vertically extending slot 136, receiving pin 138 projecting laterally from arm 128. In the normal rest position of the parts as seen in FIGURE 20, the link 134 is pushed downwardly by stub shaft 151 to an extent sufficient to locate pin 138 above the lower end of slot 136.

At its upper end, link 134 is connected to one end of an expansion spring 140, the other end of which is anchored to the side plate 42. Fixedly secured to the upper end portion of the link 134, adjacent spring 140, is an obtusely-angular stop plate 142, projecting beyond the upper end of the link, and extending normally into engagement with the periphery of wheel 143.

Intermediate its ends, link 134 is pivotally connected as at 144 to the outer end of an elongated error control link 146, the inner end of which is pivotally connected to the core of an error control solenoid 148.

To the underside of the forward end portion of operator 118 is fixedly secured a transversely extending abutment 150, which in the latched position of the operator 118 engages the shoulder 132.

The shift link 134 floats at its upper end, being normally pulley generally upwardly and to the right in FIGURE 20 by the spring 140. The movement in an upward direction is limited by engagement of pin 138 against the lower end of slot 136. Movement of the link 134 to the right, at its upper end, is controlled by engagement of the stop plate 142 against the periphery of the wheel 143, with which the stop plate is in slidable contact. Wheel 143 is driven at slow speed, making a single rotation per cycle of operation of the apparatus.

Assuming that the operator 118 is in its normally latched position, at the appropriate time during the cycle it will be unlatched for the purpose of shifting the sweeper bar from its FIGURE 5 to its FIGURE 7 position. This occurs when wheel 143, during its single slow rotation per cycle, turns to a position in which stub shaft 151 carried thereby bears against the link 134. Further rotation of the wheel in a counter-clockwise direction, viewing the same as in FIGURE 20, causes the link 134 to be shifted downwardly by stub shaft 151 against the restraint of the spring 140. Initially, the latch arm 128 will not move downwardly therewith, due to the lost motion connection defined by the slot 136 and pin 138. However, as wheel 143 continues to rotate, eventually the pin 138 will be forced downwardly by the link 134, so as to disengage the shoulder 132 from the abutment 150.

Operator 118 is now free to be pulled to the left in FIGURES 19 and 20 by the spring 126. This causes the sweeper bar 112 to be moved from its FIGURES 5 to its FIGURE 7 position.

The operator 118, in its released position, will be disposed as in FIGURE 22. In this position of the operator 118, it will be so disposed that a laterally projecting lug 152 carried by its front end will be in the path of movement of the pointed free end of a return arm 154 fixed to the wheel 143 for rotation therewith. As the wheel continues to rotate during its single full turn per cycle, arm 154 will engage lug 152, and against the restraint of spring 126, will shift the operator 118 back to its FIGURE 20 position.

It may be noted, in this connection, that when the operator 118 is in its released position, its abutment 150 will be disposed in slidable contact with the top edge of the latch arm 128, so as to hold the latch arm in a slightly lowered position. When arm 154 engages lug 152, and begins to move the same to the right in FIGURE 22, abutment 150 will slide along the top edge of the arm 128, which will be pulled upwardly against the abutment by the force of spring 140 transmitted through link 134. As soon as the abutment 150 clears the shoulder 132, arm 128 will snap back to its FIGURE 20 position, to latch the operator 118 once again in its home or normal position.

Figure 1:
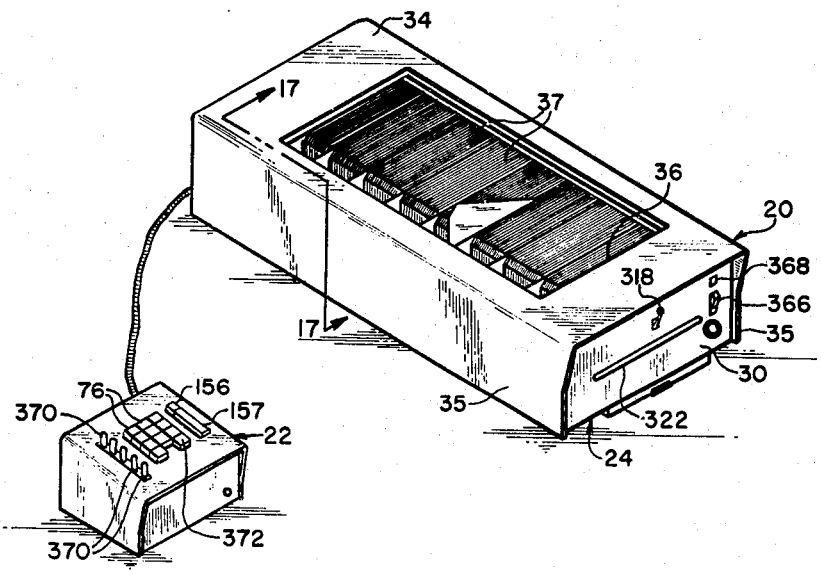
FIG. 1 is a perspective view of an apparatus according to the present invention, showing a single file tray in association with a keyboard.

It may sometimes happen that during the impression of a complete, coded number on the apparatus, as for example the above-mentioned number 714,938, the user may depress a wrong key 76. In these circumstances, one depresses the reset or error control button 156 (FIGURE 1). This energizes the solenoid 148. The core of the solenoid (FIGURE 20) is immediately retracted, so that through the medium of the link 146, the shift link 134 is thrown to the left at its upper end, pivoting about the pin 138. The upper end of the link 134 is thus moved out of the path of the stub shaft 151. Under the pull of spring 140, link 134 is instantly, under these circumstances, drawn upwardly at the left of stub shaft 151, viewing the same as in FIGURE 20. This is permitted by the lost motion connection defined by pin 138 and slot 136. In effect, the upper end of link 134 travels about stub shaft 151 in a clockwise direction when this occurs. Arm 128, in these circumstances, remains latched with the sweeper operator 118.

The depression of the reset button 156 not only actuates the solenoid 148, but also starts motor 57 and hence cycles the machine without effecting the ejection of the cards.

Thus, whenever the reset button is depressed, the sweeper bar will not be moved from its home position shown in FIGURE 5, and this is the reason why the apparatus may be put through the rest of the cycle without ejecting any cards. The user then starts a new cycle by impressing the correct code number upon the apparatus. This time, assuming that a complete, correct code number has been impressed upon the apparatus by selection of the proper keys 76, one simply pushes a motor or actuator bar 157, which cycles the machine without operating the error control solenoid 148.

VERTICAL LIFT MECHANISM

Cooperating with the sweeper mechanism, and with the selector slides, in supporting, selecting, and projecting cards that answer to the code impressed upon the machine, is a vertical lift mechanism generally designated 158.

The vertical lift mechanism 158, as shown in FIGURES 5-10, extends in parallel relation to the slides 48, along the side of the slide assembly opposite the side along which the sweeper mechanism is disposed. With the cards 37 positioned across the slide assembly, the vertical lift mechanism will underlie the left end portions of the cards, while the sweeper mechanism 108 underlies the right end portions (the terms "left" and "right" refer to the cards or other components only as they appear in the drawing and are used solely to facilitate understanding of the apparatus).

Mechanism 158 includes a vertical lift bar 160, having a card-supporting lip 161 extending along its top edge. Bar 160 is movable vertically between opposite extreme positions shown in FIGURES 7 and 8 respectively. The vertical movement of the bar 160 is effected by a shift bar 162 extending in longitudinally contacting relation to the bar 160 (FIGURES 5, 23, and 24). Shift bar 162, at locations spaced longitudinally thereof, has cam surfaces 164 formed in its top surface, said surfaces being formed as straight inclines engaging laterally projecting pins 166 of the lift bar.

Formed in the lift bar are relatively short, vertically disposed guide slots 168, receiving pins 170 that project through horizontally disposed guide slots 174 of shift bar 162 from two of the selector slide guides 50. These would be the guides 50 located adjacent the ends of the selector slides.

Referring to FIGURE 23, connected at one end to a bracket 176, affixed to the shift bar 162, is an expansion spring 178, the other end of which is connected to a lower control bar support shelf 172. Spring 178 normally biases the shift bar to the left in FIGURE 23 in the direction of its length, to the position shown in this figure of the drawing. As a result, whenever the bar 162 is free to move in this way, under the pull of the spring 178, it will lower the bar 160 to its FIGURE 7 position. Conversely, when the shift bar 162 is shifted to the right in FIGURE 23 against the restraint of the spring 178, the vertical lift bar 160 will be raised either to a partially elevated position (see FIGURE 6) or to a fully elevated position (FIGURE 9), according to how far the shift bar is so moved. Extending in parallel relation to the vertical lift bar is a lower card control bar 180, engaging the lower left corners of the cards 37. An upper card control bar 182 engages the upper right corners of the cards.

At this point, it should be noted that during initial insertion of the coded elements, it is important that they be positioned accurately. I therefore, provide a guide bar 183 paralleling and coextensive with the upper card control bar 182. Guide bar 183 cooperates with control bars 180, 182 in positioning the cards when they are initially inserted to assure alignment of the notches of the cards with the selector slides.

In the shift bar 162 are longitudinally spaced clearance slots 184 for the vibrating shafts 56. Shafts 56 extend through bearing openings formed in the adjacent side wall of the shelf 172, and are driven by the motor throughout the selection and ejection operation.

A yoke generally designated 185 includes a pair of yoke arms 186, 188 disposed (see FIGURE 3) at opposite sides of motor 57. The yoke arms, at their upper ends, are pivotally suspended from the supporting frame by pivot pins 190 (see FIG. 24).

Normally biasing the yoke in a clockwise direction, viewing the same as in FIGURE 24, are expansion springs 191 connected between the lower portions of the yoke arms and the support frame.

Connected between the yoke arms, and comprising a part of the yoke, is an upper cross member 192. This, as shown in FIGURE 3, extends transversely of the apparatus below the motor 57. The upper cross member extends through transversely aligned, downwardly opening, rectangular notches 194 formed in the selector slides 48 (FIGURE 12).

A lower cross member 196 connected between the yoke arms 186, 188 at the lower ends thereof completes the formation of the yoke 185. The lower cross member has the function of moving the vertical shift bar 162 in a rearward direction, that is, to the right in FIGURES 23 and 24, against the restraint of the spring 178.

The forward extremity of the shift bar 162 has an adjustable abutment, engageable with the lower cross member 196 of the yoke 185. To this end, I provide a screw constituting an adjustable stop or abutment 198. The screw is adjustably positioned, through the medium of nuts 199, in a clearance opening formed in a laterally projecting ear or lip 200 formed upon the rearward extremity of the shift bar 162.

Limiting the swinging of yoke 185 in a clockwise direction, viewing the same as in FIGURE 24, is a pair of stops 204, located adjacent the arms 186, 188, and provided with rubber facings engaging the lower cross member 196.

Adjacent the yoke arms 186, 188, I provide cams 206, carried by and rotatable with a shaft 207 driven through a single 360° angular movement in each cycle of operation of the equipment. The cams 206 are adapted to engage cam follower lugs 208 provided upon the yoke arms 186, 188 above the cross member 192.

A right-angular latch bar 210 is pivoted intermediate its ends upon a pivot pin 212 carried by plate 43 of the frame. Latch bar 210 is normally biased in a counterclockwise direction, viewing the same as in FIGURE 24, by an expansion spring 214 connected between the upper end of the latch bar and the adjacent partition 43 of the supporting frame.

Formed upon the lower end of the latch bar is a laterally projecting lip 216, adapted to engage an abutment 218 secured to the shift bar 162.

A latch bar release pin 220 is carried by a collar 222 rotatable with shaft 207 adjacent the latch bar.

The mechanism shown in FIGURE 24 acts upon the vertical shift bar in the following manner:

Initially, the vertical lift bar 160 is in the position shown in FIGURE 5. This is a partially elevated position. In these circumstances, the cam pins 166 carried by the vertical lift bar are partway up the sloped cam surfaces 164. In other words, the vertical shift bar 162, at this time, is moved to the right from its FIGURE 24 position, but is not so moved to the full extent of its permissible travel in this direction.

This is the position of the vertical lift bar between cycles of operation of the device.

In any event, this position, which can be appropriately termed a middle position, is one in which the top surfaces of the vertical lift bar and the sweeper bar 112 are substantially coplanar.

It will be seen from FIGURES 5 and 6 that under these circumstances, all the cards are horizontally supported, out of contact even with those slides 48 that have been elevated.

When the vertical lift bar is in this position, the shift bar 162 will be moved to the right in FIGURE 24 to an extent sufficient to cause the lip 216 of the latch bar to be engaged in back of the abutment 218. This restrains the shift bar from being pulled to the left in FIGURE 24 under the force of the spring 178, to a position in which the vertical lift bar would be fully lowered (that is, the position of the parts shown in FIGURE 23 and 24).

From the vertical lift bar position shown in FIGURES 5 and 6, the operation proceeds to a point at which the vertical lift bar is to be fully lowered as in FIGURE 7.

This dropping of the vertical lift bar is effected by rotation of collar 222 to a point at which the pin 220 biases the latch bar clockwise in FIGURE 24 against the restraint of spring 214, causing lip 216 to move upwardly out of engagement with abutment 218. The shift bar 162 is thus unlatched, and spring 178 pulls it to its FIGURE 24 position, causing the cam pins 166 to move to the lower ends of the cam surfaces 164, thereby allowing the vertical lift bar to gravitate to its fully lowered position.

With the vertical lift bar 160 fully lowered, resulting from disengagement of latch bar 210 from abutment 218, the cycle continues, the parts now being as shown in FIGURES 7 and 24.

As the cycle continues, the cams 206 rotate with shaft 207 in the direction of the arrow shown in FIGURE 24, until they engage follower lugs 208 on yoke arms 186, 188. Yoke 185 now swings rearwardly, that is, to the right in FIGURE 24. The lower cross member 196, when so moved, carries the vertical lift shift bar with it, so as to cause the vertical lift bar 160 to again move upwardly, as the pins 166 are cammingly engaged by the slopes 164.

It is important to note that this movement of the bar 162 is that which effects, at the other end of the bar, the translator-return motion of the bell crank 94.

The movement of the yoke 185 as described immediately above causes the pins 166 to move fully to the upper end portions of the cam surfaces 164. The vertical lift bar will now be moved upwardly to its fully raised position through the initial phases of the card ejection sequence, which is shown in FIGURE 8. After the selector slides 48 have been reset as shown in FIGURE 9, and after the sweeper bar 112 has moved sufficiently to the left from its position in FIGURE 9 to assure the ejection of selected cards so that they begin to pass over and above the lower control bar 180, the vertical lift bar 160 slowly drops back to its middle or partly elevated position shown in FIGURE 10, while the sweeper bar 112 continues to fully eject the selected cards.

The movement of the lift bar back to its middle position occurs by reason of the fact that while the shift bar 162 is being moved to the right in FIGURE 24 by yoke 185 for the purpose of elevating lift bar 160 to its "high" position shown in FIGURE 9, the latch bar 210, being free at this time from engagement by the latch release pin 220, will be held in sliding contact with the slope 219 under the pull of spring 214. Therefore, the latch bar will be moved in back of the abutment 218, during the movement of the shift bar 162 to the right in FIGURE 24. The lift bar 162 will be moved to the right in FIGURE 24 to a point wherein the lip 216 will be well in back of the abutment 218. Then, when the cam 206 moves out of camming engagement with the yoke 185, the bar 162 will be pulled to the left in FIGURE 24, by spring 178, but will travel under the pull of spring 178 only to the extent permitted by the latch bar, the lip 216 of which will now engage abutment 218 once again. In this position of the parts, the pins 166 are only partway up the cam surfaces 164. Therefore, the lift bar 160 will be in its middle or partially elevated position shown in FIGURE 10, awaiting the beginning of the next cycle.

DIVIDER ASSEMBLY

My apparatus includes means to retain the cards in readily manageable groups or decks, in the file tray. This means comprises a divider assembly generally designated 224, and shown to particular advantage in FIGURES 3, 4, 17, and 18.

The divider assembly includes a plurality of pairs of dividers, with each deck of cards being engaged between the dividers of a pair. One divider of each pair is fixed. The other is movable and cooperates with the fixed divider of the same pair to hold all the cards of the deck vertically, in such fashion as to prevent deformation, warping, or the like when the device is not in use, while at the same time relaxing the grip of the dividers upon the cards during a cycle sufficiently to facilitate selection and ejection of the desired cards.

The dividers of each pair, at times, grip the deck engaged therebetween firmly, to prevent the cards of the deck from warping or bending.

At other times, the dividers of a pair, having sensed the thickness of the deck engaged thereby, are in loose engagement with the deck, that is, the movable divider backs off from the side of the deck immediately adjacent thereto to a predetermined extent, as for example, approximately 3/16". In these circumstances, the cards of the deck are still maintained in a desired, vertical position, but are engaged with sufficient looseness to permit selected cards to shift relative to unselected cards to such extent as is necessary to ultimately bring them to their FIGURE 10, ejected position. This loose engagement of the decks persists through the greatest part of each selection and ejection cycle.

The number of pairs of dividers can vary, according to the size of the particular apparatus. In every instance, however, each pair includes movable and fixed dividers, 226, 228, respectively, comprising parallel plates in vertical planes, extending transversely across access opening 36. The fixed dividers 228 are rigidly joined to the support frame 47.

Apertured ears 229 on the end of each movable divider 226 loosely receive the end portions of a movable divider support rod 230, the ends of which are slidably engaged in elongated upper guide slots 232 formed in the side plates 40, 42 respectively. Each slot 232 is associated with a single support rod 230 in each guide slot 232 (FIGURE 17).

In this way, each movable divider is mounted for sliding movement toward and away from its cooperating, fixed divider 228. To maintain the movable divider in a vertical plane during its travel toward and away from the fixed divider, I provide guide arms 234 fixedly secured to the ends of, and extending downwarly rearwarly from, each movable divider. Pins 236, projecting outwardly from the respective guide arms 234, slidably engage in lower guide slots 238 offset longitudinally of the apparatus (see FIGURES 4 and 17) from their associated upper guide slots 232.

Expansion springs 240, connected at one end to the ends of each support rod 230, are attached at their other ends to rack support bars or trackways 242 fixedly secured to the outer surfaces of the side plates 40, 42. The rack support bars 242 are of right-angular cross-section, and mounted upon their top surfaces are racks 244. The racks 244 extend the full length of the divider assembly 224 so as to be common to the several pairs of dividers. Meshing with the racks are pinions 246 secured to the opposite ends of each support rod 230.

At one side of the apparatus, that is, adjacent the side plate 40, a rubber-surfaced roller or locking shoe 248 is rotatable with each support rod 230, between the side plate 40 and the pinion 246 adjacent said side plate. Overlying and coplanar wiith the several rollers 248 is an elongated, flat divider lock bar or shoe contactor 250, having a plurality of spaced longitudinally extending combination cam and guide slots 252, each of which receives a combined cam and guide pin 254 projecting laterally outwardly from the side plate 40. The slots 252 are of obtuse-angular form, and this shape of the slots is such that when the pins 254 are in the right-hand ends of the slots, viewing the same as in FIGURE 17, the lock bar 250 will be raised out of engagement with the rubber surfaces of the roller 248.

When lock bar 250 is shifted to the right in FIGURE 17, to its FIGURE 18 position, it will initially begin to move downwardly as it travels to the right, due to the inclination of the right-hand ends of the slots 252. This causes the bottom edge of the lock bar 250 to engage the surfaces of the rollers 248.

Since the rollers are surfaced with soft rubber or the like, the bar 250 will exert a slight compressive action upon the rollers, at the time that the pins 254 move into the horizontal, left-hand portions of the slots 252. This creates a frictional engagement with the several rollers such that further movement of the lock bar 250, to the right in FIGURE 17, causes the rollers to turn clockwise in this figure of the drawings, thus moving the movable dividers slightly to the right in FIGURE 17. The provision of transversely aligned pinions 248 and racks 244, cooperating with guide arms 234 and pins 236, insures that the movable dividers will remain in vertical planes normal to their direction of movement at all times.

The movable dividers thus travel from their FIGURE 17 position, in which they are in full gripping engagement with the deck of cards 37, to their FIGURE 18 position, in which they are backed off from the deck to a slight, predetermined extent. When the pins 254 are in the left-hand ends of the slot 252 (as in FIGURE 18), the movable dividers will be backed off from the deck a prescribed fraction of an inch, as for example, the above-mentioned 3/16". This is the position assumed by the movable dividers throughout the time that the cards are being vibrated, that is, while they are being selected and ultimately brought to their FIGURE 10 position. The lock bar 250, at this time, will hold the rollers 248 against any rotatable movement, due to the above-mentioned compressive action of the lock bar upon the roller.

The means whereby the lock bar is given its longitudinal movement, with the desired transverse directional component, is shown in FIGURES 17 and 18. At one end of the lock bar, there is provided a slot-like opening loosely receiving a connecting pin 256 which also extends loosely through the upper end of a divider lock bar control arm 258. This provides a pivotal connection between arm 258 and bar 250 which is also designed to allow for the arcuate travel of the upper end of the arm 258, as well as for the horizontal and vertical motions of bar 250.

Arm 258 swings upon a pivot pin 264 carried by the side plate 40, and intermediate opposite ends of the arm, there is secured thereto a cam follower 266, having an isosceles-triangular portion projecting forwardly for camming engagement by an eccentric pin 268 on a cam 270 secured to shaft 207 for rotation therewith. Formed in the cam 270, approximately diametrically opposite pin 268, is a dwell 272.

Secured to and projecting forwardly from the lower end of the arm 258 is an angular extension 274, having on its free end a cam follower lug 276 adapted to be engaged by the surface of the cam 270.

By reason of this arrangement, in one position to which the cam 270 rotates, its pin 268 will engage the follower 266, to bias the arm 258 to its FIGURE 17 position, whereby lock bar 250 will be raised out of contact with the rollers 248, and will be moved fully to the extreme left-hand position thereof, viewing the same as in FIGURE 17. In these circumstances, the movable partitions will be unlocked, and will be free, under the pull of the springs 240, to move into full gripping engagement with the cards 37. This is the position of the parts when the machine is shut off, and is at rest.

At this time, as shown in FIGURE 17, the lug 276 is in engagement with the dwell 272 of cam 270.

When the lock bar 250 is in its other extreme position, shown in FIGURE 18, the pin 268 is angularly spaced from the follower 266, while the lug 276 is in engagement with the circumference of the cam 270, away from dwell 272. At this time, the engagement of the cam against the lug 276 will cause the arm 258 to be swung to its other extreme position, wherein the lock bar 250 as shown in FIGURE 18 is in locking engagement with the rollers 248.

Mounted upon side plate 40, adjacent arm 258, is a momentary-contact, shut-off switch 278, having an operating arm 280 of leaf spring material secured to and projecting outwardly from a switch arm 281. Arm 281 overlies the switch plunger and is normally biased away from the plunger by spring action to its FIGURE 17 position. In this position, the switch is "on." The free end of the operating arm 280 is in the path of the eccentric pin 268. The arrangement is such, in this regard, that when the cam 270 rotates clockwise in FIGURE 17, as it does during the card selection and ejection cycle, the pin 268 ultimately comes against the end of the arm 280 as shown in FIGURE 17. Continued rotation of the cam 270 brings the pin 268 to what might appropriately be termed a "ten o'clock" position as shown in FIGURE 18. At this time, it will have biased the arm 280 to a position in which said arm will cause depression of the switch arm 281, and hence of the switch plunger, to operate the switch to its off position. The switch controls all the circuits of the apparatus, and accordingly the apparatus shuts off with the pin 268 remaining in this position.

Energization of the appropriate electrical circuits to start the motor 57 during the next cycle of operation is caused by depressing actuator bar 157. This initiates clockwise motion of cam 270, from its FIGURE 18 position. Accordingly, as pin 268 disengages from arm 280, the switch 278 reverts to its FIGURE 17 "on" condition. Thereafter, switch 278 controls the motor operation until the switch 278 is once again operated by pin 268 to "off" position to terminate the operation of the machine and the particular card selection cycle.

When the pin moves to its "ten o'clock" position, the cam 270, acting upon the follower lug 276, will have caused the arm 258 to be moved to its FIGURE 18 position. At this time, the rollers 248 will have been engaged by the lock bar 250, and will have been rotated clockwise to an extent sufficiently to back off the movable dividers, ready for the next cycle.

Summarizing the operation of the divider assembly, it will be seen that at the beginning of a cycle, switch 278 is off, and pin 268 is at the "ten o'clock" position. At the same time, lock bar 250 is in the FIGURE 18 position, in firm, gripping engagement with rollers 248. The movable dividers 226 are backed off slightly from the decks of cards.

So far as the divider assembly is concerned, the components remain in this position, throughout the operation of selecting and ejecting the cards.

Figure 10:
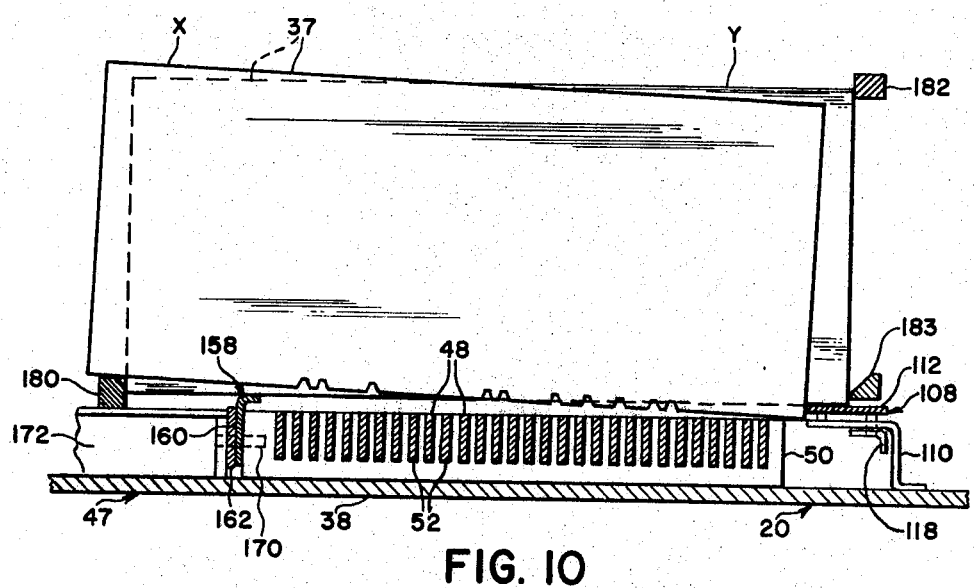

Ultimately, the cards that have been selected will move to the FIGURE 10 position, ready for manual extraction from the file tray. At this time, pin 268 will move to an "eight o'clock" position, viewing the same as in FIGURE 17, so as to begin its camming engagement with the lower slope of the cam follower 266 of arm 258. As a result, the lock bar 250 begins to move to the left from its FIGURE 18 position, out of engagement with rollers 248. Under the pull of springs 240, the partitions 226 now move into full gripping engagement with the cards. Thereafter, pin 268 moves into engagement with the upper slope of the follower 266. The lock bar 250 is now free to move, in response to engagement of cam 270 against lug 276, back to its roller-engaging position. As it moves from its FIGURE 17 toward its FIGURE 18 position, it rotates the rollers just sufficiently to back the movable dividers off from the decks of cards 37, the required distance. This is the position of the parts at the conclusion of the cycle.

The purpose of having the dividers move momentarily to the FIGURE 17 position near the end of each cycle is to cause them to adjust automatically to the thickness of each deck, to take up for any cards removed after the last preceding cycle. There is thus continual sensing of individual deck thickness by the several pairs of dividers (each operating independently of one another to perform this function) during successively following cycles of operation.

CARD PUNCH MECHANISM

In the illustrated embodiment of my invention, I include a card punch mechanism generally designated 282. This is shown to best advantage in FIGURES 2–4, 13, and 14. It serves as a means incorporated directly in the apparatus for punching cards with the desired series of code notches when they are to be added to the file.

The card punch mechanism operates in conjunction with the selector slides 48 and their associated operating mechanism, including the movable translator or carriage 78, selecting solenoids 74, and the carriage-stepping means shown to particular advantage in FIGURE 15.

The card punch mechanism includes a die block support plate 284 fixedly secured to and extending between the side plates 40, 42, at the forward extremity of the apparatus.

Fixedly mounted upon the support plate 284, and extending transversely of the several selector slides 48, is a backing block 286, a bottom die block 288, and a top die block 290. The bottom and top die blocks are positioned in face-to-face contact with the backing block, and are coextensive in length therewith.

Formed in the surfaces of the bottom and top dies, that are in contact with the backing block 286, are closely spaced, vertical punch recesses 292, 294, of the bottom and top die blocks 288, 290 respectively. The punch recesses of the bottom die block align with corresponding recesses of the top die block 290.

Figure 13:
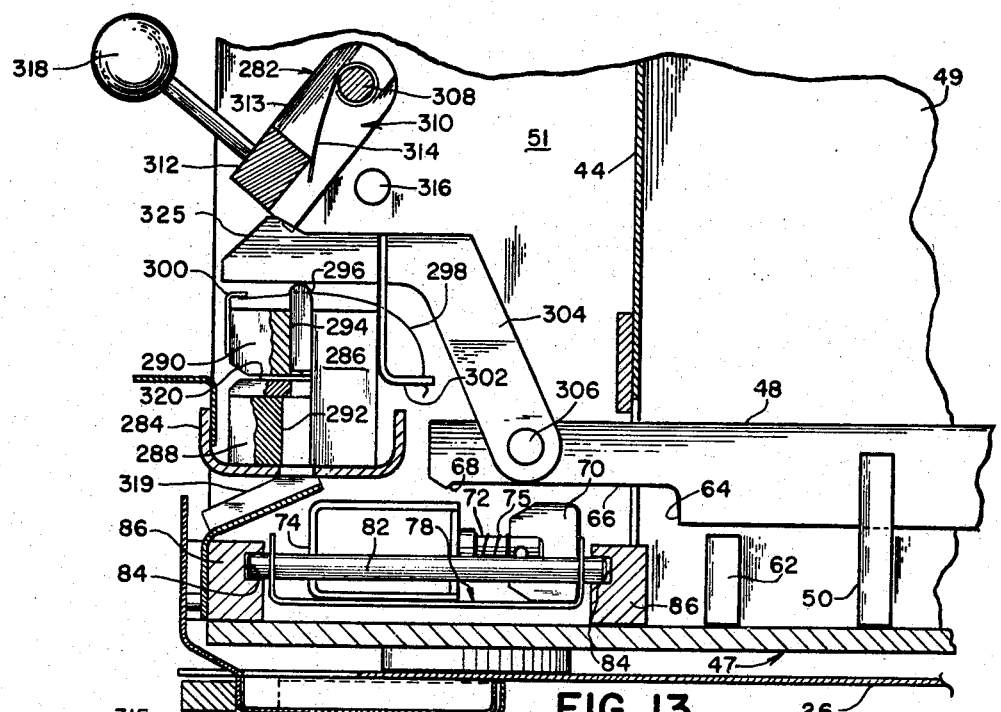
FIG. 13 is an enlarged fragmentary, longitudinal, vertical sectional view showing the card-punching mechanism in its normally retracted position, taken substantially on line 13—13 of FIG. 2.
Figure 14:
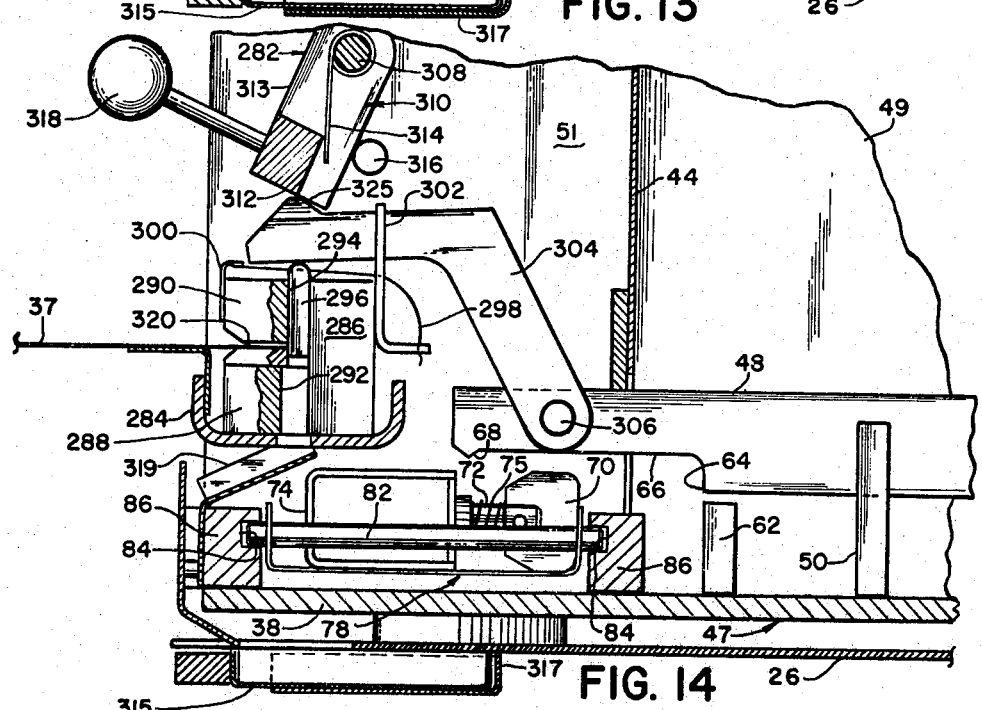
FIG. 14 is a view like FIG. 13 showing the card-punching mechanism in its punching position with a card inserted.

Mounted for vertical sliding movement in each punch recess 294 is a punch 296, having a rounded upper end formed with an opening through which extends a spring wire 298 normally biasing the punch upwardly to its retracted, FIGURE 13 position. At one end, the wire is engaged under a rearwardly projecting lip formed upon a spring wire retainer plate 300 secured to and coextensive in length with the top die block 290. The other end of the spring wire curves downwardly as shown in FIGURES 13 and 14, being secured to a rearwardly projecting flange on the lower edge of an interposer guide bar 302 fixedly secured to and projecting upwardly from the backing block 286.

The upwardly projecting portion of the interposer guide bar is formed with a series of closely spaced guide slots receiving the substantially horizontally extending, forwardly projecting, free end portions of obtuse-angular interposers 304. There is a separate interposer 304 for each selector slide 48, pivoted as at 306 to its associated selector slide.

The free end portions of the interposers 304 project over the several punches 296, in such position as to depress the punches when swung downwardly about their pivots 306.

Extending transversely of the series of interposers 304 is a yoke support shaft 308 the ends of which are secured in the side plates 40, 42. Pivotally depending from the shaft 308 is a shallowly U-shaped yoke generally designated 310 including an elongated interposer depresser bar 312, the ends of which are secured to yoke arms 313 swingably supported upon shaft 308. Torsion springs 314 coiled about the shaft 308 adjacent yoke arms 313 are anchored at one end, and at their other ends are engaged against the depressor bar 312, tending to bias the bar clockwise as viewed in FIGURES 13 and 14, to its normally retracted position shown in FIGURES 4 and 13.

Limiting swinging movement of the yoke in a counterclockwise direction, against the restraint of springs 314, are stop lugs 316 projecting inwardly from the side plates 40, 42.

For the purpose of swinging the yoke from its normally retracted FIGURE 13 position to its depressed, punch-actuating position, I provide a handle 318, which as shown in FIGURE 1 projects through a suitable opening in the adjacent end panel 30 of the housing.

The top die block 290 is spaced upwardly from the bottom die block a distance sufficiently to define an entrance slot 320 therebetween, communicating with the series of punch recesses. The entrance slot 320 is accessible to a user through a slot 322 (FIGURE 1) provided in the housing below the handle 318. Thus, a card 37 can be inserted through slot 322 to enter the slot 320.

To receive scraps resulting from the punching of the cards, I provide a tray 315 mounted to slide into and out of the housing below the support plate 38. The tray slides in a tray or drawer support 317 affixed to the underside of plate 26. The die block support plate 284 will have, a below the row of punch recesses, a discharge slot for the card scraps, through which the scraps can gravitate to an inclined chute 319, for movement through a vertical chute into the tray for removal.

A momentary switch 324 is fixedly mounted upon the support frame, adjacent one end of the yoke, and includes a spring leaf 326 (FIGURE 2) disposed in position to be depressed by the bar 312, when said bar is manually swung to its depressed, punch-actuating position. The switch is of the normally off type, and when leaf 326 is depressed, the switch will be operated to its on position, to close a circuit through the motor 57, whereby to operate the movable components of the apparatus through a cycle, similarly to the movement required for selection and ejection of the cards. Thus, the selector slide assembly, carriage or translator 78, and driving components associated therewith, operate through the same sequence of steps, when all the selector slides necessary for the purpose of punching a card with a particular coded number have been raised, as is true when cards are actually being selected and ejected.

The operation of the card punch mechanism 282 is as follows:

Assuming that a new card is to be made, with a particular series of notches according to the coding system described in my co-pending application Ser. No. 285,336, filed June 4, 1963, the user first inserts the card through the slot 322, to the position shown in FIGURE 14. Then, one simply depresses the appropriate keys 76, in succession, the same as when putting the cards of equivalent information-bearing, coded elements through the selection and ejecting cycle. As previously described herein, the depression of each key produces an elevation of an appropriate pair of selector slides 48, said slides moving from the full-line to the dash-line position shown in FIGURE 4.

The movement of the slides so selected, to the FIGURE 4 dash-line position, results in a corresponding forward movement of the interposers 304 connected to the selected, elevated slides. The interposers 304, when so moved, will travel from their retracted, full-line positions to a forward position in which they will underlie yoke 310 so as to be interposed between the yoke and the row of punches 296.

When all the required slides 48 have been raised, the user swings the yoke from its retracted, FIGURE 13 position to its punch-actuating FIGURE 14 position. When the yoke is so swung, it moves to a position in which its bar 312 is behind raised surfaces 325 provided on the interposers. Thereafter, when the raised slides are reset with the yoke 310 held manually in its depressed position, the interposers will be cammed downwardly at their free ends, as they pass under the bar 312 (see FIG. 14). The interposers that are so engaged depress their associated punches 296 to form notches in the cards at the exact locations represented by the selected, elevated slides 48. The coded number is thus transferred physically to the card. When the card is thereafter inserted in the file tray, it will be ejected whenever the user, during a card selection and ejection procedure, depresses the same keys, in the same order, as were depressed when the card was notched.

Slides 48 that have not been raised will remain in the full-line position thereof shown in FIGURE 4, so that their interposers are retracted, out of the path of swinging movement of the yoke when the yoke travels to its depressed position of FIGURE 14.

As noted above when the yoke is depressed, it initiates the operation of the drive mechanism, which ultimately, by swinging of the yoke 185 to the right from its FIGURE 24 position, retracts and resets the slides 48. The machine is thus ready for insertion of a new card, to be punched with a different series of code notches.

DRIVE MECHANISM

The means which I have embodied in my apparatus for the purpose of mechanically driving appropriate components thereof is shown primarily in FIGURES 3 and 4. It includes, as the source of driving power, the motor 57. Motor 57 can appropriately to be considered as being mounted in the rear end portion of the apparatus, in a motor compartment defined between slide plate 42 and partition 43.

Rotatable with the shaft 330 of the motor is a small drive pulley 332 (FIGURES 3 and 20) about which is trained drive belt 334 driving large pulley 336 which is secured to and rotates shaft 338 journalled in side plates 40, 42.

The area between partition 43 and side plate 40 can appropriately be termed a reduction gearing compartment. In this compartment there is provided a series of reduction gears and pulleys, from selected ones of which various components are driven.

Rotating with shaft 338 is a small vibrator shaft drive pulley 340 about which is trained belt 342 extending adjacent the selector slide series (FIGURES 3 and 17). Belt 342 is trained about and drives pulley 344, secured to one of the vibrator shafts 56. Pulley 344 is of the double-grooved type, and also trained thereabout is a second vibrator belt 346, continuing on to the forwardly disposed vibrator shaft 56, it being understood that said forwardly disposed shaft would have a pulley secured thereto, driven by the belt 346.

At this point, speed reduction has been effected only to a limited degree, that is, shaft 338 still rotates at relatively high speed, so as to impart high speed rotational movement to the vibrator shafts and thus assure a good vibratory action.

Also secured to shaft 338 is a small pulley 348, driving belt 350 trained about larger pulley 352 secured to a shaft 354. A small pinion gear 356 is secured to shaft 354 for rotation therewith, and is in mesh with a larger gear 358, secured to and rotatable with shaft 360. Small gear 362, rotating with shaft 360, is in mesh with larger gear 364 rotatable with and driving shaft 207 through a single turn during each complete cycle of operation of the apparatus.

OPERATION: CARD SELECTION AND EJECTION

Let it be assumed that with the appartus in a full "off" and "locked" condition, it is desired to select and remove all cards coded "714,938" randomly filed in the various decks of cards contained in the file tray.

By "locked" I mean a fully deactivated condition in which the machine is placed, for example at the conclusion of a work day. At that time, one can open the operating circuits in such a manner as to move the dividers into a full gripping engagement with the cards. The cards are thus held fimly in a flat condition without possibility of warpage, entry of dust, etc. Further, the movable dividers are free to be pulled back manually for insertion of new or previously removed cards in any desired quantity.

To do this, one operates a reversing switch 368 after conclusion of a cycle. At such time, as already noted, the movable dividers 226 will be locked, by engagement of bar 250 against rollers 248, in positions in which they are slightly backed way from the nearest cards 37.

Eccentric pin 268 will be in the FIGURE 18 position, and switch 278 will be in its open or "off" condition.

Operation of reversing switch 368 to one extreme position thereof under these circumstances causes the motor 57 to operate momentarily, in reverse. This causes the cam 270 to turn counterclockwise. It stops with the parts in their FIGURE 17 position, with switch 278 in "on" condition.

Through appropriate circuitry incorporating switch 278, this deactivates the operation of the keyboard, in that the several keys thereof will not cause operation of their associated mechanisms.

The dividers will, at this time, be in their card-gripping positions, since bar 250 will be out of contact with rollers 248.

As the first step in operating the apparatus after it has been shut down and "locked" in the maner described above, the main switch 366 is thrown to "on" position.

The reversing switch is then operated to its other extreme position, in which it energizes the motor and operates the cam 270 momentarily in its normal, clockwise direction. This causes the pin 268 to return to its FIGURE 18 position from its FIGURE 17 position. Dividers 226 will now be backed off slightly from the cards, and locked. Switch 278 will be "off."

The next step is to operate the file select key 370 controlling the particular tray 20 that is to be used.

In this connection, in FIGURE 1 the keyboard has a plurality of file select keys 370, but only a single tray 20 is illustrated. It will be understood, in this regard, that only one of the file select keys so illustrated is needed for the single tray. The keyboard shown is for a console or multiplex arrangement, including a plurality of file trays, all controlled from a single keyboard. In such an event, each key 370 would control a different fiile tray. Thus, a keyboard as shown would be used to control five different trays. Each would operate under the control of a single key 370. However, the other keys of the single keyboard, that is, the code keys 76, reset key 156, motor bar 158, and a space key 372, are common to all the file trays in a multiplex arrangement of this type.

Each file select key 370 is a conventional single-pole, single-throw switch operable between "on" and "off" positions. If thrown to "on" position, it electrically connects its corresponding card selection tray to the keyboard for regular operation.

Having operated the file select key 370, one now depresses the various keys 76 in order, to impress the desired complete code number upon the apparatus.

As previously described herein, depression of each key causes a pair of selector slides 48, responding to the code, to be elevated. Thus, in impressing the digit "7," the first digit, upon the apparatus, the selector slides disposed in zone location *a* in two zones (for example, zones 3 and 4) will be raised. Details of a code which I have used to advantage on my apparatus are contained in my copending application Ser. No. 285,336, filed June 4, 1963, now Patent No. 3,231,186.

In any event, responsive to depression of the first selected key 76, the stepping solenoid 99 is energized simultaneously with the appropriate pair of slide selection solenoids 74. The stepping solenoid is then automatically promptly deenergized to step the carriage 78 to a position locating the several cam plates 70 of solenoids 74 under the slides lying in location *b*. The stepping operation proceeds as other keys are depressed in turn.

In this way, the various slides corresponding to the code impressed upon the apparatus are raised in pairs, in turn. Thereafter, assuming that the complete coded number has been impressed upon the apparatus, the motor bar 157 is momentarily depressed. This energizes the motor.

At the beginning of a cycle, the vertical lift bar 160 and sweeper 112 are disposed as shown in FIGURE 5. When the slides are elevated, the parts will appear as in FIGURE 6. The lift bar and sweeper at this time have not moved, since the motor has not so far been placed in operation.

The depression of the motor bar at this time now produces the following operational sequence:

First, shafts 56 are set into motion. Then, sweeper bar 112 and vertical lift bar 160 are retraced to their FIGURE 7 positions. All the cards gravitate and come to rest on the raised slides 48. At this time, the continued rotation of shafts 56 will cause vibration of the cards to assure gravitation of the wanted cards below the unwanted cards as shown in FIGURE 7.

As a result, those cards which were selected will now drop below the unselected cards (see FIGURE 7), since their notches will coincide with all of the raised selector slides. For better understanding of the operation, the cards to be selected have been designated by the reference character X, and the unselected cards have been designated Y, in FIGURES 7–10.

The raised slides will enter the notches of the cards X, as shown in FIGURE 7. Meanwhile, the unselected cards Y will remain in elevated position, being supported upon the raised slides due to the fact that they will not have all their notches in registration with said raised slides.

Continued operation of the apparatus now causes the vertical lift bar to be moved to its fully raised or "high" position shown in FIGURE 8 as the next step in the operational sequence. It is to be recalled at this time that at the beginning of the cycle, the vertical lift bar was in what might be termed its "middle" or partly elevated position, shown in FIGURES 5, 6, and 10.

The elevation of the vertical lift bar to its FIGURE 8 position causes the cards X to be tilted to the position shown in FIGURE 8, with their upper right hand corners moving under the upper control bar 182. The unselected cards Y will be raised vertically by the vertical lift bar at this time, because their upper-right corners have remained in contact with the left vertical face of the upper control bar 182, and have not dropped below the bar. This is due to the fact that the right hand portions of cards Y will remain supported by the raised slides at an elevation such that they cannot move under the bar 182.

The next step in the operation is the lowering of all the raised selector slides (FIGURE 9). This resetting of the raised slides 48 is effected simultaneously, to all intents and purposes, with the elevation of the lift bar 160 to its full upper position, it being understood that the slide resetting step occurs because of the swinging of the yoke 185 fully to its maximum right hand position, viewing the same as in FIGURE 24.

The parts are now as in FIGURE 9. The selected cards X, having dropped below the upper control bar, will now have their lower right hand corners resting on sweeper bar support 110. The unselected cards Y will not drop at this end because they are engaged at their upper right and lower left corners by control bars 182, 180 respectively.

The next step in the operation occurs when the sweeper bar 112 moves back to its home position as shown in FIGURE 10. Since the selected cards X have been tilted with their upper right corners under the control bar 182, they will be engaged at their lower right corners by the sweeper bar as it so moves. The unselected cards Y, however, will remain out of contact with the sweeper bar, so that the sweeper bar will move thereunder without ejecting the same.

The lower left corners of the selected cards X, as seen from FIGURE 9, will be above the top edge of the lower control bar 180. Therefore, when the sweeper bar 112 moves to its home position as in FIGURE 10, it will move the selected cards to positions in which they project beyond the unselected cards, ready for removal.

At this time, all the parts will be back to their home positions. The carriage or translator 78 will have been returned responsive to operation of the drive mechanism through its normal cycle, and the vertical lift bar will be back to its middle position. The movable partitions will have momentarily moved fully into gripping contact with the decks at the end of the cycle, after the selected cards have been shifted to their ejected, FIGURE 10 positions before being backed off the predetermined small amount, in the manner described previously herein, to await the next cycle.

With particular reference to FIGURES 5-10, and to facilitate the understanding of the position of the lift bar 160, sweeper bar 112, and slides 48 during the various phases of the operating sequence, the following table is helpful:

| Figure | Phase of Sequence | Position of Lift Bar 160 | Position of Sweeper Bar 112 | Position of Selected Slides 48 |
|---|---|---|---|---|
| 5 | Start | Middle | Advanced | Lowered |
| 6 | Card selection | do | do | Raised |
| 7 | Lowering selected cards | Low | Retracted | Do. |
| 8 | Tilting selected cards | High | do | Do. |
| 9 | Clearing selected cards | do | do | Lowered |
| 10 | Ejecting selected cards | Middle | Advanced | Do. |

If one were to have made an error during the impression of the coded number upon the apparatus, it is merely necessary to depress the reset or error control key 156. This has the effect of energizing solenoid 148, to move the link 134 to a position out of the path of stub 151, so that it will not be driven downwardly for the purpose of releasing the sweeper bar operator 118. If the sweeper bar is not moved from its home position, no cards will be ejected and the cycle will continue to its end without disturbing any cards. Thereafter, the user can impress the correct coded number upon the cards and proceed.

It is also possible to "group-select" cards. Assume, for example, that it is desired to select all cards having a first digit "7," a second digit "1," a third digit including all between "0" and "9," and fourth, fifth, and sixth digits as follows: "9," "3," and "8."

In these circumstances, one depresses the first two keys as previousy described herein. Then, one depresses space key 327. This causes the steping solenoid 99 to be energized, but not the slide selection solenoid 74, thus to advance the carriage one step without raising any selector slides for the third digit. The remaining keys are then depressed as previously described herein. When the motor bar is actuated, all cards in a group as described immediately above will be selected. Of course, this group selection can be carried out through many more digits occurring anywhere in this complete number, in fact, all the digits except one.

ELECTRICAL CIRCUITS

The electrical circuits typically used in the apparatus are described last herein because it has been considered that their nature is better understood after the construction and opeartion of the card punching selection, and ejection mechanisms have been learned.

Figure 25:
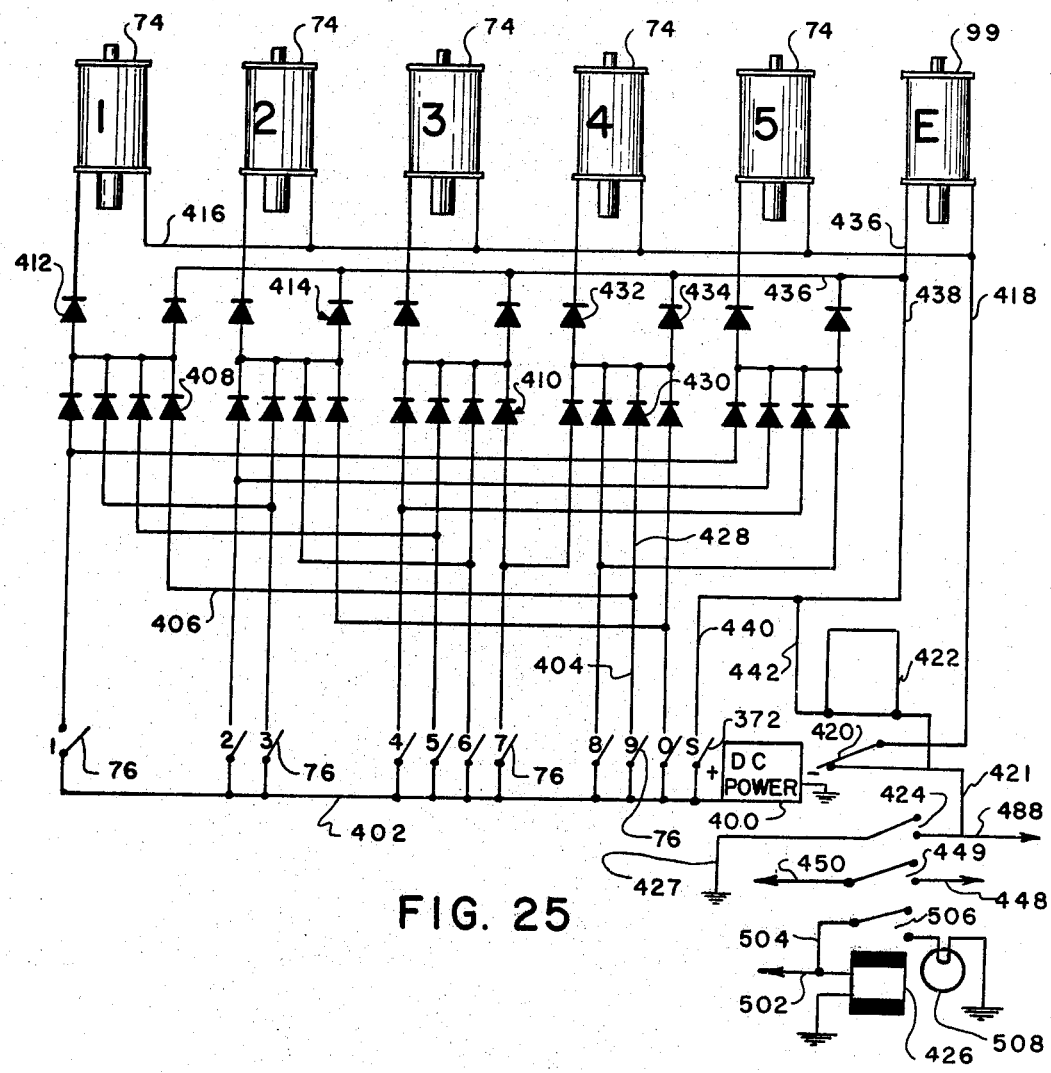
FIG. 25 is a schematic view showing a portion of the electrical circuitry embodied in the device.

FIG. 25 shows, schematically, the encoding operation from the keyboard to the translator solenoids 74 and to the automatic escapement or stepping solenoid 99.

In impressing upon the apparatus the typical "two out of five," channelized, binary code structure hereinafter described, the keyboard keys or switches 76 are operated in a desired sequence. These in the present instance—but not necessarily—are identified numerically, being designated "1" through "0" as shown on the diagram. The code structure, as noted, is merely typical. Other code concepts can be used in the apparatus as designed, if desired.

From the positive side of a DC power supply 400, power is supplied to one terminal of all the normally open keyboard encoding switches 76 and space key or switch 372, through lead 402. Assuming for the sake of example that the switch 76 bearing the code designation "9" is now closed, current flows through leads 404, 406, rectifier 408 of selection rectifier bank 410, rectifier 412 of anti-feedback rectifier bank 414, solenoid 74 controlling elevation of the selector slides of slide group "1," lead 416, lead 418, closed contacts 420 of a pulse control relay 422, lead 421, closed contacts 424 of a file select relay 426, and back to the DC power supply through lead 427. Relay 426 is energized prior to operation of switches 76 as described with reference to FIG. 25.

At the same time that current flows through the solenoid 74 controlling slide group "1," current will be supplied similarly through lead 428, rectifier 430 of bank 410, rectifier 432 of bank 414, the translator solenoid 74 for slide group "4," and back to the power supply 400 as described above. In a code of the type described in my co-pending application Ser. No. 285,336 filed June 4, 1963, the elevation of two slides, responsive to energization of the translator solenoids controlling slide groups "1" and "4" as previously described in the present application, represents the digit "9."

The escapement or stepping solenoid 99 (designated "E" in the diagram for its escapement function) is energized simultaneously with the selected solenoids 74, as follows: leads 404 and 428, rectifier 430, rectifier 434, lead 436, solenoid 99, lead 418, and back to the power supply as previously described.

Energized simultaneously with the selected solenoids 74 and solenoid 99 is a pulse control relay 422, as follows: to lead 436 as described; thence through lead 438, lead 442, relay 422, and back to the power supply as previously described.

Energizing of relay 422 causes contacts 420 thereof to open. Therefore, solenoids 74 and 99 are only energized momentarily even if the selected, depressed switch 76 is held closed by the user. The translator is thus advanced one step, to locate the several solenoids 74 in operating position in respect to the next following slides of their associated slide groups.

Depression of any selected switch 76 will energize the two solenoids related therewith, the solenoid 99, and relay 422 in the same manner as the example described above for the digit "9."

If the spacing switch 372 is closed, as for example during a group selection procedure as hereinbefore described, only the solenoid 99 and relay 422 will be energized, as follows: leads 440, 438, and 436, solenoid 99, lead 418, and back to power supply. Also, current will flow through leads 440, 442, relay 422 and back to the power supply. Again, the relay contacts 420 open the circuit. The result is a one-step advancement of the translator 78 without elevating any slides 48.

Figure 26:
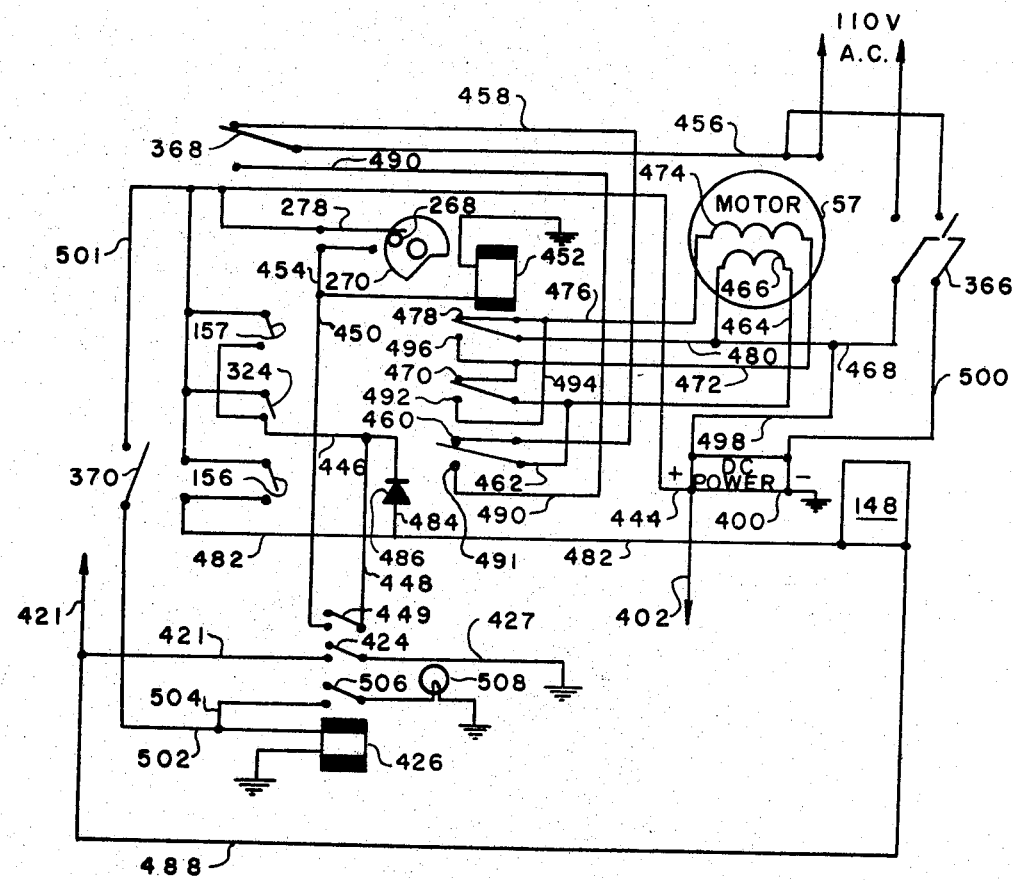
FIG. 26 is a schematic view of the portion of the circuitry controlling the motor operation and file tray selection.

Referring to FIG. 26, this shows the cycle control circuitry. With the main switch 366 closed, and after having gone through the encoding operation as schematically shown in FIG. 25, one depresses motor bar or actuating switch 157. DC voltage from power supply 400 flows through lead 444, closed motor actuating switch 157, leads 446 and 448, closed contacts 449 of file select relay 426 (shown also in FIG. 25), leads 450, motor control relay 452, and return to the DC power supply through ground.

This starts the motor cycle, driving cam 170 clockwise in FIG. 26. Switch 278, which was open when the motor bar or switch 157 was depressed, closes, so that current now flows through lead 454 to hold the relay 452 in an energized condition despite the opening of switch 157 after the user releases the same.

Current now passes from an AC power supply through lead 456, reversing switch 368, lead 458, relay contacts 460 (closed by energization of relay 452), leads 462 and 464, motor winding 466, lead 468, closed switch 366, and return to AC power supply.

At the same time, current will pass through relay contacts 460 to closed contacts 470, lead 472, motor winding 474, lead 476, closed contacts 478, lead 480, lead 468, and back to the AC power supply. This causes operation of the motor in its normal direction for completing a single cycle of card selection and ejection.

When lug 268 of cam 270 returns to its so-called "10 o'clock" position, switch 278 opens, thus deenergizing relay 452. This opens contacts 460, 470, and 478. There is a resultant interruption of AC current flow to the motor 57, causing the motor to stop.

The punch actuating switch 324 is in parallel with motor switch 157. Accordingly, whenever a card is being punched, switch 324 is used instead of the motor switch, and accomplishes the same function of running the motor through its normal cycle to return the translator, etc., preparatory to punching the next card.

The same is true of the error control switch 156. Being in parallel with motor switch 157, it is used to run the motor through its cycle when an error has been made and it is desired to clear the apparatus without selecting and ejecting cards. Current here flows through leads 482 and 484, rectifier 486, lead 448, closed relay contacts 449, and on through the remaining circuitry as described with reference to motor switch 157. Rectifier 486 prevents reverse current flow from switches 278, 324, or 157 from operating solenoid 148.

When switch 156 closes, current also flows through lead 482 to error control solenoid 148. Current flows back to the DC power supply from the solenoid 148 through a connecting lead 488. The solenoid 148 can be of the "continuous" rather than the "intermittent" type, so as to be capable of remaining energized without burning out in the event the reset or error control switch 156 is not immediately released. Or, if an intermittent type of solenoid is used, the switch 156 can be of a type in which its contacts break automatically immediately after making even though the switch button is held down.

Referring now to the reverse operation of motor 57, operation of reversing switch 368 from its illustrated position changes the polarity of motor winding 474 and reverses the motor, by supplying AC voltage through contacts of motor relay 452 in the deenergized condition of this relay. Thus, as cam 270 now operates in a counterclockwise direction, cycle control switch 278 closes to energize relay 452, which then interrupts the AC voltage as hereinbefore described to shut off the motor. Then, return of the reversing switch to its FIGURE 26 position will cause the motor to operate in its normal direction, with cam 270 turning clockwise until its reaches its FIGURE 26 position, opening switch 278 to shut the motor off. Details are as follows:

The user operates reversing switch 368 from its normal, FIGURE 26 position to free the movable dividers 226 so that cards can be inserted or the machine "locked" for the night. AC voltage thus passes through lead 456, switch 368, lead 490, relay contact 491, lead 462 (relay 452 being deenergized at this time), lead 464, through motor winding 466 in a normal direction, and return to the AC power supply through lead 468.

At the same time, AC voltage passes from lead 462 through relay contact 492, lead 494, lead 476, motor winding 474 (reverse direction), lead 472, relay contact 496, lead 480, and lead 468 back to the AC power supply. Thus, the motor is caused to operate in a reverse direction, with cam 270 turning counterclockwise from its FIG. 26 position until switch 278 closes. When this happens, motor control relay 452 becomes energized, so that its three sets of contacts are operated to their FIG. 26 position. This interrupts the AC voltage flowing from lead 490 to the two motor windings. Thus, the motor stops with the pin 268 of cam 270 in a "9 o'clock" position. The movable dividers are thus freed and under their spring loading, grip the cards.

To return the machine to normal operation, the user operates the switch 368 back to its normal, FIG. 26 position. AC voltage now passes through lead 456, switch 368, lead 458, relay contact 460 (relay 452 being energized by DC power flowing through lead 444 and closed switch 278), lead 462, lead 464, motor winding 466 (normal direction), lead 468, and back to the AC power supply.

Also, AC voltage passes through contact 460, lead 462, contact 470, lead 472, motor winding 474 (normal direction), lead 476, contact 478, and leads 480, 468 back to the AC supply. Thus, the motor operates in a normal direction, and cam 270 turns clockwise, with pin 268 travelling from its "9 o'clock" to its "10 o'clock" position to open switch 278. This interrupts DC voltage in line 454 to relay 452. When relay 452 is deenergized, AC power is interrupted at contact 460 and the motor stops.

Voltage in the DC power supply, it may be noted, is present whenever the device is connected to the AC power supply and switch 366 is closed, through the provision of power supply leads 498 extending to lead 468 and one side of the AC power supply, and 500, extending to the other side of said AC power supply.

As previously pointed out, a single keyboard is usable with a multiplicity of file trays 20. There could be any number of trays, limited only by the number of file select keys 370 on their common keyboard.

It will be understood that the keyboard has a separate switch 370 for each tray 20 in the system. The user closes switch or switches 370 at the start of the keyboard indexing operation, to permit use of the tray or trays controlled thereby. File select relay 426 of the particular tray that is controlled by a selected, depressed switch 370 (relay 426 is shown deenergized in FIG. 26) is accordingly energized, as a result of DC voltage passing through lead 444, lead 501, closed switch 370, lead 502, relay 426, and ground.

When relay 426 is energized, current will flow through lead 501, closed switch 370, lead 502, lead 504, closed relay contacts 506, a pilot lamp 508 mounted on the housing of the associated tray, and back through ground. This shows visibly that a particular tray has been selected, and is in a stand-by condition awaiting regular use. The lamp is thus illuminated only when the relay 426 of the associated tray is energized.

It is to be noted, also, that the solenoids 74, 99, and 148 have their negative sides connected to the negative side of the DC power supply only through the contacts 424 of the file select relay 426. Thus it is seen that relay 426 must be energized before any of these solenoids is operative.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:

1. Apparatus for selecting and displacing to an access position information-bearing elements of the coded type, comprising:

(a) a support structure;

(b) a series of selector members movable between a rest position, and an advanced position in which wanted elements are displaced from unwanted elements in response to movement of the several elements into contact with the advanced members;

(c) element-support means normally spacing the coded elements from said members, said means being movable to retracted positions in which the elements are freed for said contact with the advanced members;

(d) at least two dividers for supporting the several elements in a compact, orderly deck during their selection and displacement to an access position, at least one of the dividers being movable toward and away from the other between element-gripping and releasing positions respectivley; and (e) divider operating means responding to said movement of the selector members to dispose the dividers in their element-releasing position until the wanted elements are displaced to their access position, said divider operating means then shifting the dividers momentarily to an element-gripping position with the wanted elements in their access position to sense the thickness of the deck, and thereafter relatively moving the dividers apart a distance greater by a predetermined amount than the thickness of the deck.

2. Apparatus for selecting and displacing to an access position information-bearing elements of the coded type, comprising:

(a) a support structure;

(b) a series of selector members movable between a rest position, and an advanced position in which wanted elements are displaced from unwanted elements in response to movement of the several elements into contact with the advanced members;

(c) element-support means normally spacing the coded elements from said members, said means being movable to retracted positions in which the elements are freed for said contact with the advanced members;

(d) a plurality of like, spaced pairs of dividers in said structure for retaining the several elements in separate compact, orderly decks during their selection and movement to access position, the dividers of each pair including at least one movable divider shiftable toward and away from the other divider of the same pair whereby the dividers of each pair are relatively movable between element-gripping and -releasing positions, the selector members and element-support means being common to all the dividers for conjoint selection of elements retained in the several decks; and (e) divider operating means responding to said movement of the selector members to dispose the dividers in their element-releasing position until the wanted elements are displaced to their access position, said divider operating means then shifting the dividers momentarily to an element-gripping position with the wanted elements in their access position to sense the thickness of the deck, and thereafter relatively moving the dividers apart a distance greater by a predetermined amount than the thickness of the deck.

3. Apparatus for selecting and displacing to an access position information-bearing elements of the coded type comprising:

(a) a support structure;

(b) a series of selector members movable between a rest position and an advanced position in which wanted elements are displaced from unwanted elements in response to movement of the several elements into contact with the advanced members, said members being in the form of elongated, parallel, closely-spaced, flat bars underlying the information-bearing elements, the top edges of said bars being in direct contact with the bottom edges of both the wanted and unwanted elements, when the members are in their element-selecting position.

(c) element-support means normally spacing the coded elements from said members, said means being movable to retracted positions in which the elements are freed for said contact with the advanced members; and (d) vibrating means mounted on said structure in contact with the selector members, the selector members being mounted with a degree of looseness sufficient for transmitting vibratory motion thereto from the vibrating means in at least the element-selecting position of said members, whereby to in turn vibrate said elements in their selector-member-contacting position and thus minimize surface adhesion of the wanted to the unwanted elements, during their selection and displacement by the selector members, said vibrating means comprising a plurality of shafts spaced longitudinally of and arranged transversely of the several selector members, said shafts in the rest position of the selector members extending within recesses of said members out of contact with the members, said shafts in the advanced positions of the members being offset from the recess in contact with the bottom edges of the members, said shafts being rotatably mounted in the support structure and having a common driving connection, the shafts when viewed in cross-section having projecting portions on their circumferences at least in the selector-member-contacting areas thereof so as to produce said vibratory motion of the members in response to rotation of the shafts, in a series of planes defined by the flat widths of the several selector members.

4. Apparatus as in claim 3, said apparatus further including a driving linkage interconnecting the element-support means and said shafts to require rotation of the shafts at the time the elements are freed to contact the selector members in response to the retraction of the element support means.

5. Apparatus to select, and move to an access position, coded information-bearing elements from a quantity of said elements filed at random, comprising:

(a) a support structure;

(b) a series of selector slides mounted therein with freedom to move both longitudinally and transversely, said slides being normally disposed in retracted positions;

(c) element-support means normally holding the several elements out of contact with the selector slides, and movable to withdrawn positions in which the elements are freed to contact said slides;

(d) means for shifting selected slides in the direction of their lengths from their normally retracted positions; and (e) vibratory means normally disposed out of contact with the several slides, the selected slides engaging said means when shifted in the direction of their lengths, whereby to vibrate the elements through the slides when the elements are freed by the element-support means and are in contact with the slides, said slides having sloped surfaces engaged by the vibratory means when the slides are shifted longitudinally, thus to cammingly bias the selected slides in the transverse direction to an element-selecting position in which unwanted elements, the code of which is not in correspondence with the moved slides, will be displaced from the elements to be selected, said vibratory means comprising at least one shaft extending transversely of the several slides and mounted for rotation while in camming engagement with the slides, said shaft being adapted to effect vibration of the slides in response to rotation of the shaft, the several slides being disposed in parallel relation with the shaft underlying the same perpendicularly thereto, said slides having downwardly opening recesses providing said sloped surfaces and receiving the shaft in the retracted positions of the slides.

6. Apparatus as in claim 5 wherein the recesses of the several slides are aligned transversely of the entire series thereof, said shaft being normally disposed in the recesses, the longitudinal movement of the selected slides being over a distance effective to shift the slides to positions in which the shaft is disposed clear of the recesses thereof in engagement with the bottom edges of said selected slides adjacent the recesses, to vibrate the moved slides of said series.

7. Apparatus as in claim 5 wherein said vibratory means comprises a plurality of rotary shafts linked for conjoint rotation and surfaced to effect vibration of the slides in response to their rotary motion, said shafts being spaced longitudinally of the slides in perpendicular relation thereto and projecting beyond opposite sides of the series of slides so as to vibrate at least all of the moved slides simultaneously at locations spaced longitudinally of the slides, each slide having like cam recesses spaced longitudinally thereof and receiving the respective shafts, said sloped surfaces constituting one edge of the respective recesses, corresponding recesses of the several slides being aligned transversely of said series for simultaneous camming of selected slides to their element-selecting position in response to simultaneous longitudinal movement thereof.

8. Apparatus for selecting and displacing to an access position information-bearing elements of the coded type, comprising:
  (a) a support structure;
  (b) a series of selector members movable between a rest position, and an advanced position in which wanted elements are displaced from unwanted elements in response to movement of the several elements into contact with the advanced members;
  (c) element-support means normally spacing the coded elements from said members, said means being movable to retracted positions in which the elements are freed for said contact with the advanced members;
  (d) at least two dividers for supporting the several elements in a compact, orderly deck during their selection and displacement to an access position, at least one of the dividers being movable toward and away from the other between element-gripping and -releasing positions respectively;
  (e) vibrating shafts rotatably mounted in said structure in contact with the several selector members thus to vibrate said members and hence the coded elements when the elements are in contact with the members; and
  (f) divider operating means responding to said movement of the selector members to dispose the dividers in their element-releasing position until the wanted elements are displaced to their access position, said divider operating means then shifting the dividers momentarily to an element-gripping position with the wanted elements in their access position to sense the thickness of the deck, and thereafter relatively moving the dividers apart a distance greater by a predetermined amount than the thickness of the deck, said divider operating means including a driving connection to said shafts rotating the same at least when the dividers are in their element-releasing position with the element-support means retracted to facilitate movement of the freed elements onto the advanced selector members.

References Cited

UNITED STATES PATENTS

| | | | |
|---|---|---|---|
| 742,035 | 10/1903 | Johnson | 129—16.1 |
| 3,303,492 | 2/1967 | Cross | 129—16.1 X |
| 971,495 | 9/1910 | Eacrett. | |
| 2,217,744 | 10/1940 | Gruenhut | 129—16.1 |
| 2,395,924 | 3/1946 | Wade | 129—16.1 |
| 2,585,720 | 2/1952 | Anderson. | |
| 2,665,694 | 1/1954 | Mooers et al. | 129—16.1 |
| 2,795,226 | 6/1957 | Bralove et al. | 129—16.1 |
| 3,092,114 | 6/1963 | Jonker | 129—16.1 |
| 3,292,631 | 12/1966 | Cross | 129—16.1 |

FOREIGN PATENTS

| | | |
|---|---|---|
| 829,953 | 5/1938 | France. |
| 951,359 | 10/1956 | Germany. |
| 912,859 | 12/1962 | Great Britain. |

JEROME SCHNALL, Primary Examiner